(12) United States Patent
Moriyama et al.

(10) Patent No.: US 7,699,344 B2
(45) Date of Patent: Apr. 20, 2010

(54) STEERING DEVICE

(75) Inventors: Seiichi Moriyama, Maebashi (JP); Kenji Fujikawa, Maebashi (JP)

(73) Assignee: NSK Ltd., Tokyo (JP)

( * ) Notice: Subject to any disclaimer, the term of this patent is extended or adjusted under 35 U.S.C. 154(b) by 82 days.

(21) Appl. No.: 11/909,811

(22) PCT Filed: Feb. 20, 2007

(86) PCT No.: PCT/JP2007/053102

§ 371 (c)(1), (2), (4) Date: Sep. 27, 2007

(87) PCT Pub. No.: WO2007/097340

PCT Pub. Date: Aug. 30, 2007

(65) Prior Publication Data

US 2008/0252056 A1 Oct. 16, 2008

(30) Foreign Application Priority Data

Feb. 21, 2006 (JP) ............................. 2006-044496
Dec. 12, 2006 (JP) ............................. 2006-334129

(51) Int. Cl.
*B62D 1/18* (2006.01)

(52) U.S. Cl. .................................................. 280/775

(58) Field of Classification Search ................. 280/775, 280/777; 74/493
See application file for complete search history.

(56) References Cited

U.S. PATENT DOCUMENTS 5,845,936 A * 12/1998 Higashino .................... 280/775
6,324,935 B1 * 12/2001 Schoen et al. .................. 74/493
6,357,318 B1 * 3/2002 Koellisch et al. .............. 74/493
6,450,531 B1 * 9/2002 Rinker et al. ................. 280/775
6,467,807 B2 * 10/2002 Ikeda et al. .................. 280/775
7,445,241 B2 * 11/2008 Higashino .................... 280/777
2006/0028010 A1 * 2/2006 Yamada ....................... 280/775
2006/0151984 A1 * 7/2006 Higashino et al. ........... 280/775

FOREIGN PATENT DOCUMENTS

| JP | 8-207787 A | 8/1996 |
|---|---|---|
| JP | 11-301492 A | 11/1999 |
| JP | 2001-347953 A | 12/2001 |
| JP | 2004-82868 A | 3/2004 |
| JP | 2005-161985 A | 6/2005 |
| JP | 2006-168492 A | 6/2006 |
| JP | 3415953 B2 | 9/2007 |

* cited by examiner

*Primary Examiner*—Faye M. Fleming
(74) *Attorney, Agent, or Firm*—Sughrue Mion, PLLC

(57) ABSTRACT

A steering device including a column rotatably supporting a steering shaft on which a steering wheel is mounted; a vehicle body attaching bracket that is attachable to a vehicle body and has a pair of right and left side plates for holding right and left side surfaces of the column therebetween; a fastening rod spaced from the axis of the column and inserted into the side plates of the vehicle body attaching bracket and the column; and fastening members arranged at both ends of the fastening rod to fasten the inner surfaces of the side plates to the side surfaces of the column, wherein contact surfaces of the right and left side surface of the column and the inner surfaces of the side plates are formed in two parts including a part near the axis of the fastening rod and a part spaced from the axis of the fastening rod.

9 Claims, 13 Drawing Sheets

STEERING DEVICE

TECHNICAL FIELD

The present invention relates to a steering device and more particularly to a steering device in which the telescopic position (a forward and backward position) or the tilting position (an inclination angle) of a steering wheel is adjustable in accordance with a physique or a driving position of a driver.

BACKGROUND ART

In the steering device that the telescopic position or the tilting position of the steering wheel is adjustable, after the telescopic position or the tilting position of the steering wheel is adjusted, a column is firmly clamped to a vehicle body attaching bracket so that the steering wheel does not move from that position.

As a steering device in which a telescopic position is adjustable and an outer column is clamped to an inner column, there is a steering device disclosed in Patent Document 1. In the steering device disclosed in the Patent Document 1, since the inner column is strongly fastened to the outer column, a position offsetting from the axis of the outer column is fastened.

FIG. 7 is an enlarged longitudinally sectional view showing a conventional steering device in which a position offsetting from the axis of an outer column is fastened. As shown in FIG. 7, in the hollow and cylindrical outer column 1, a steering shaft 4 is supported to freely rotate. To the steering shaft 4 in the rear side of a vehicle body (a front side in the direction intersecting at right angles to the surface of a sheet of FIG. 7), a steering wheel not shown in the drawing is attached.

To a cylindrical inner peripheral surface 15B formed in the outer column 1 in the front side of the vehicle body (an interior side in the direction intersecting at right angles to the surface of the sheet of FIG. 7), an inner column is internally fitted. The outer column 1 is attached to the vehicle body 6 by a vehicle body attaching bracket (an upper bracket) 3.

A part of the inner column 2 in the front side of the vehicle body is pivotally supported by the vehicle body 6 through a tilting central shaft not shown in the drawing. On the upper part of the vehicle body attaching bracket 3, a pair of right and left flange parts 31A and 31B for attaching the vehicle body attaching bracket 3 to the vehicle body 6 is formed. The flange parts 31A and 31B are fastened to the vehicle body 6 by bolts 312A and 312B and abutting surfaces 311A and 311B on the upper surface of the flange parts 31A and 31B abut on the vehicle body 6 and are fixed thereto. In the flange parts 31A and 31B, a pair of right and left side plates 32A and 32B are bent in L shapes and extend downwardly from the flange parts 31A and 31B.

In the lower part of the outer column 1, clamp parts 11A and 11B are integrally formed. In the lower surface of the outer column 1 and the lower surfaces of the clamp parts 11A and 11B, a slit 13 is formed so as to pass through from the outer peripheral surface 15A to the inner peripheral surface 15B of the outer column 1. The slit 13 is formed over the entire length of a telescopic position adjusting range of the outer column 1.

Between inner surfaces 321A and 321B of the side plates 32A and 32B of the vehicle body attaching bracket 3, side surfaces of the clamp parts 11A and 11B are held so as to move telescopically and tilt.

In the clamp parts 11A and 11B, telescopic long grooves 12A and 12B elongating in the axial direction of the outer column 1 are formed in the lower part of the axis of the outer column 1. Further, a fastening rod 34 is inserted into tilting long grooves 33A and 33B formed in the side plates 32A and 32B and the telescopic long grooves 12A and 12B from the right side of FIG. 7 (intersecting at right angles to the axis of the outer column 1).

In the right side of the fastening rod 34, a disk shaped head part (a fastening member) 341 is formed. In the outer periphery of the head part 341, chamfered parts 342 and 342 are formed in parallel. The chamfered part 342 is internally fitted to the tilting long groove 33B to prevent the fastening rod 34 from rotating relative to the vehicle body attaching bracket 3 and to achieve tilt movement of the fastening rod 34 along the long tilting groove 33B.

An end face 343 of the head part 341 abuts on an outer surface 322B of the side plate 32B. In a left side of the fastening rod 34, a male screw 344 is formed. To the male screw 344, a cylindrical nut (a fastening member) 35 is screwed. An end face 351 of the nut 35 abuts on an outer surface 322A of the side plate 32A. To the nut 35, an operating lever 36 is fixed through a washer 37 and a bolt 38.

Inside surfaces of the clamp parts 11A and 11B respectively, abutting surfaces 17A and 17B are formed in the vicinity of the axis of the fastening rod 34. The abutting surfaces 17A and 17B lightly abut on the inner surfaces 321A and 321B of the side plates 32A and 32B, even when the fastening rod 34 is unfastened. The abutting surfaces 17A and 17B can abut on the inner surfaces 321A and 321B of the side plates 32A and 32B over the entire length of the telescopic position adjusting range of the outer column 1.

The outer peripheral surface 15A of the outer column 1 has a space between the inner surfaces 321A and 321B of the side plates 32A and 32B and the outer peripheral surface 15A, even when the fastening rod 34 is fastened.

When swinging the operating lever 36, the nut 35 rotates so that the side plates 32A and 32B is fastened through the fastening rod 34 or a fastening state is released. That is, when the operating lever 36 is swung in a fastening direction, the nut 35 rotates and the end face 351 of the nut 35 moves to a right side of FIG. 7 and the fastening rod 34 moves to a left side of FIG. 7.

As a result, the end face 351 of the nut 35 fastens the outer surface 322A of the side plate 32A and the end face 343 of the head part 341 fastens the outer surface 322B of the side plate 32B. Thus, the inner surfaces 321A and 321B of the side plates 32A and 32B strongly press the abutting surfaces 17A and 17B in the vicinity of the axis of the fastening rod 34 to deform the clamp parts 11A and 11B toward the axis of the outer column 1 and narrow the width of the slit 13.

As a result, the diameter of the inner peripheral surface 15B of the outer column 1 is reduced to strongly fasten the outer column 1 to inner column 2. At the same time, the abutting surfaces 17A and 17B in the vicinity of the axis of the fastening rod 34 are strongly fastened by the inner surfaces 321A and 321B of the side plates 32A and 32B.

Accordingly, the axis of the outer column 1 is considered to be a fulcrum point, a center of the abutting parts of the abutting surfaces 17A and 17B in the vicinity of the axis of the fastening rod 34 and the inner surfaces 321A and 321B is considered to be a power point, and the clamp parts 11A and 11B are fastened by a moment proportional to a distance L2 between the fulcrum point and the power point. Therefore, the outer column 1 can be strongly pressed to the inner column 2.

However, the fastening position of the side plates 32A and 32B of the vehicle body attaching bracket 3 and the outer column 1 is located in the vicinity of the axis of the fastening rod 34 spaced downward from the axis of the outer column 1.

Accordingly, when a steering force is applied to the outer column 1 from the steering wheel, in a moment applied to the vehicle body attaching bracket 3 by this steering force, the abutting surfaces 311A and 311B of the flange parts 31A and 31B and the vehicle body 6 are considered to be a fulcrum point. Further, a center of the abutting parts of the abutting surfaces 17A and 17B in the vicinity of the axis of the fastening rod 34 and the inner surfaces 321A and 321B are considered to be a power point. A large force acts on the vehicle body attaching bracket 3 by a moment proportional to a distance L1 between the fulcrum point and the power point. Accordingly, a rightward and leftward supporting rigidity in FIG. 7 is low relative to the steering force applied to the outer column 1.

In order to improve the supporting rigidity of the vehicle body attaching bracket, the vehicle body attaching bracket may be reinforced, however, a problem arises that the cost of a material is high and a weight increases. Further, to improve the supporting rigidity of the vehicle body attaching bracket 3, the abutting surfaces 17A and 17B in the vicinity of the axis of the fastening rod 34 may be extended near the axis of the outer column 1. However, since there is a dimensional unevenness in production, the fastening position of the side plates 32A and 32B of the vehicle body attaching bracket 3 and the outer column 1 is limited to a part in the vicinity of the axis of the fastening rod 34. Thus, it is difficult to improve the supporting rigidity of the vehicle body attaching bracket 3.

In steering devices disclosed in Patent document 2 and Patent Document 3, a spacer made of a synthetic resin is interposed between inner surfaces of a vehicle body attaching bracket and both right and left side surfaces of an outer column to improve the supporting rigidity of the vehicle body attaching bracket. However, in the steering device disclosed in the Patent Document 2, since the number of parts is increased, a problem arises that the cost of the parts is high and the number of assembling processes is increased.

Patent Document 1: JP-A-2001-347953
Patent Document 2: JP-A-8-207787
Patent Document 3: JP-B-3,415,953

DISCLOSURE OF THE INVENTION

Problems that the Invention is to Solve

It is an object of the present invention to provide a light steering device in which the number of parts or the number of assembling processes is not increased, a fastening force of an outer column to an inner column is improved and the supporting rigidity of the outer column to a vehicle body attaching bracket is improved.

Means for Solving the Problems

The above-described problems are solved by below-described means.

According to a first aspect of the invention, there is provided a steering device including:

a column that supports a steering shaft on which a steering wheel is mounted so as to freely rotate;

a vehicle body attaching bracket that is attachable to a vehicle body and includes a pair of right and left side plates for holding right and left side surfaces of the column therebetween;

a fastening rod spaced from an axis of the column and inserted into the side plates of the vehicle body attaching bracket and the column; and fastening members arranged at both ends of the fastening rod to fasten an inner surfaces of the side plates to the side surfaces of the column, wherein contact surfaces between the right and left side surface of the column and the inner surfaces of the side plates are formed in two parts including a part near the axis of the fastening rod and a part spaced from the axis of the fastening rod.

According to a second aspect of the invention, there is provided the steering device as set forth in the first aspect of the invention, wherein the right and left side surfaces of the column respectively includes:

first abutting surfaces that abut on the inner surfaces of the side plates in the vicinity of the axis of the fastening rod;

second abutting surfaces that abut on the inner surfaces of the side plates in the vicinity of the axis of the column, and recessed parts respectively formed between the abutting surfaces and recessed from the abutting surfaces.

According to a third aspect of the invention, there is provided the steering device according the second aspect of the invention, wherein the column is an outer column externally fitted to an inner column so as to be telescopically adjustable, and the fastening members fasten the outer column to the inner column at a telescopically adjustable position.

According to a fourth aspect of the invention, there is provided the steering device according the third aspect of the invention, wherein the first and second abutting surfaces formed in the right and left side surface of the outer column are provided in the side surfaces of the outer column so as to come into contact with the inner surfaces of the side plates over a telescopic position adjusting range of the outer column.

According to a fifth aspect of the invention, there is provided the steering device according the third aspect of the invention, wherein the outer column is held between the side plates of the vehicle body attaching bracket so that a tilting position is adjustable.

According to a sixth aspect of the invention, there is provided the steering device according the third aspect of the invention, wherein when the fastening members at both the ends of the fastening rod are fastened, the first abutting surfaces abut on the inner surfaces of the side plates.

According to a seventh aspect of the invention, there is provided the steering device according the third aspect of the invention, wherein when the fastening members at both the ends of the fastening rod are fastened, the second abutting surfaces abut on the inner surfaces of the side plates.

According to an eighth aspect of the invention, there is provided the steering device according the third aspect of the invention, wherein the outer column is integrally formed with aluminum or magnesium.

According to a ninth aspect of the invention, there is provided the steering device according the second aspect of the invention, wherein the fastening members fasten the column at a prescribed tilt adjusting position.

According to a tenth aspect of the invention, there is provided the steering device according the first aspect of the invention, wherein a width between the right and left side surfaces of the column in a position spaced upward from the axis of the fastening rod in the vehicle body is equal to or larger than a width between the right and left side surfaces of the column in the vicinity of the axis of the fastening rod.

According to an eleventh aspect of the invention, there is provided the steering device according to the first aspect of the invention, wherein a width between the inner surfaces of the right and left side plates of the vehicle body attaching bracket in a position spaced upward from the axis of the fastening rod in the vehicle body is smaller than a width between the inner surfaces of the right and left side plates of the vehicle body attaching bracket in the vicinity of the axis of the fastening rod.

According to a twelfth aspect of the invention, there is provided the steering device according the first aspect of the invention, wherein the fastening members fasten the column at a tilt adjusting position, and a width between the right and left side surfaces of the column in a position spaced upward from the axis of the fastening rod in the vehicle body is equal to or larger than a width between the right and left side surfaces of the column in the vicinity of the axis of the fastening rod.

According to a thirteenth aspect of the invention, there is provided the steering device according the first aspect of the invention, wherein the fastening members fasten the column at a tilt adjusting position, and a width between the right and left side surfaces of the column in a position spaced upward from the axis of the fastening rod in the vehicle body is equal to or smaller than a width between the right and left side surfaces of the column in the vicinity of the axis of the fastening rod.

According to a fourteenth aspect of the invention, there is provided the steering device according the first aspect of the invention, wherein through holes are formed in the side plates of the vehicle body attaching bracket so that when the fastening members fasten the side plates of the vehicle body attaching bracket, the side plates of the vehicle body attaching bracket are easily elastically deformed.

According to a fifteenth aspect of the invention, there is provided the steering device according the first aspect of the invention, wherein the thickness of the side plates of the vehicle body attaching bracket is made thin so that when the fastening members fasten the side plates of the vehicle body attaching bracket, the side plates of the vehicle body attaching bracket are easily elastically deformed.

According to a sixteenth aspect of the invention, there is provided the steering device according the third aspect of the invention, wherein the first and second abutting surfaces and the recessed parts formed in the right and left side surfaces of the outer column are provided in the side surfaces of the outer column over the entire length of the telescopic position adjusting range of the outer column.

ADVANTAGE OF THE INVENTION

In the steering device of the present invention, the right and left side surfaces of the outer column include the first abutting surfaces that can abut on the inner surfaces of the side plates of the vehicle body attaching bracket in the vicinity of the axis of the fastening rod, the second abutting surfaces that can abut on the inner surfaces of the side plates of the vehicle body attaching bracket in the vicinity of the axis of the outer column, and recessed parts respectively formed between the abutting surfaces and more recessed than the abutting surfaces.

Accordingly, the number of parts or the number of assembling processes is not increased, a fastening force of the outer column to the inner column is improved and the supporting rigidity of the outer column to the vehicle body attaching bracket can be improved.

Further, the steering device of the present invention includes the abutting surfaces that are formed in the right and left side surfaces of the column and can abut on the inner surfaces of the side plates of the vehicle body attaching bracket in the vicinity of the axis of the fastening rod and the abutting surfaces that are formed in the right and left side surfaces of the column, have a width equal or larger than the horizontal width of the abutting surfaces in the vicinity of the fastening rod and can abut on the inner surfaces of the side plates of the vehicle body attaching bracket in a position spaced upward from the axis of the fastening rod in the vehicle body.

Further, the steering device of the present invention includes abutting surfaces that are formed in the inner surfaces of the right and left side plates of the vehicle attaching bracket and can abut on the right and left side surfaces of the column in the vicinity of the axis of the fastening rod and abutting surfaces that are formed in the inner surfaces of the right and left side plates of the vehicle body attaching bracket, have a width smaller than the horizontal width of the abutting surfaces in the vicinity of the axis of the fastening rod and can abut on the right and left side surfaces of the column in a position spaced upward from the axis of the fastening rod in the vehicle body.

Accordingly, the inner surfaces of the right and left side plates of the vehicle body attaching bracket abut on the right and left side surfaces of the column at both the position in the vicinity of the axis of the fastening rod and the position spaced upward from the axis of the fastening rod in the vehicle body to fasten the column. Therefore, the number of parts or the number of assembling processes is not increased, a weight is decreased and the supporting rigidity of the column to a vehicle body attaching bracket can be improved.

Figure 1:
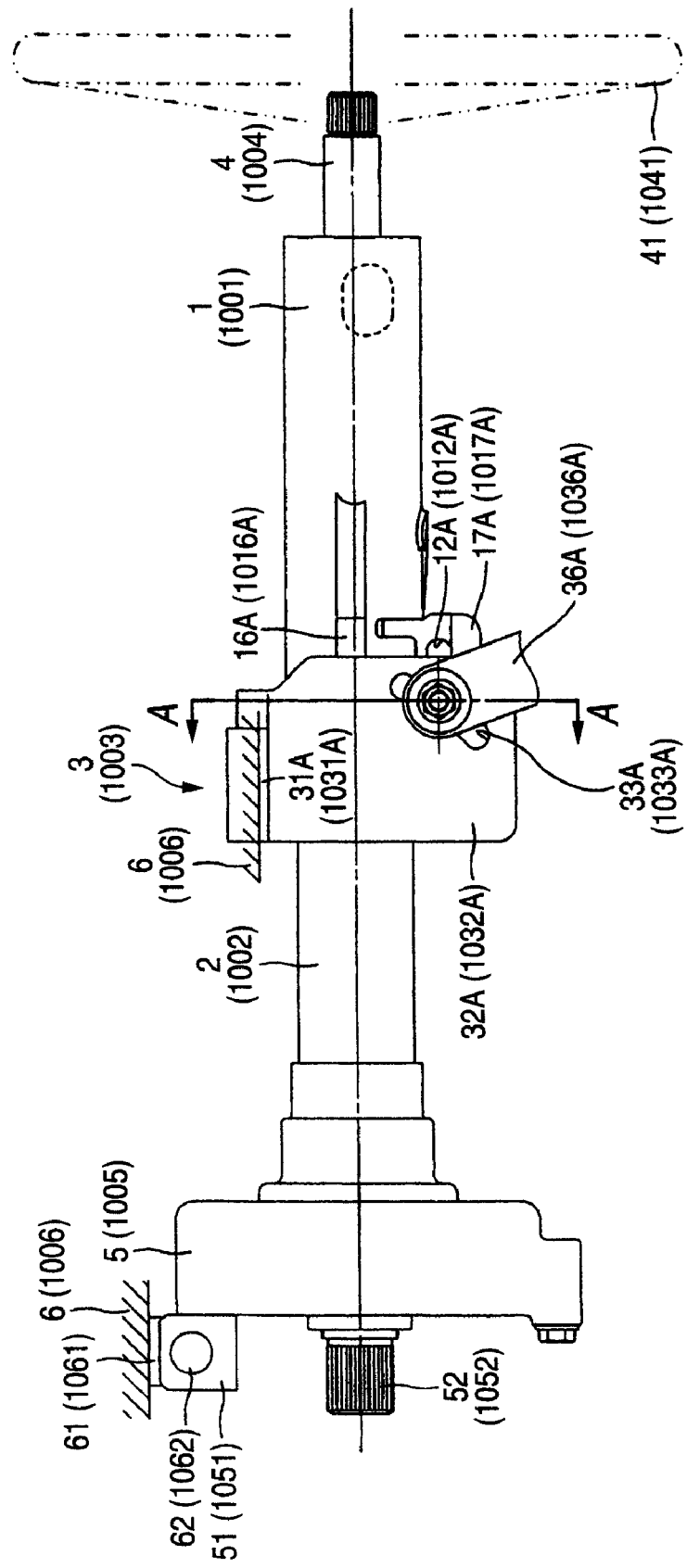
FIG. 1 is an entire front view showing a steering device of a first embodiment of the present invention.

DESCRIPTION OF REFERENCE NUMERALS AND SIGNS 1 outer column
11A, 11B clamp part
12A, 12B telescopic long groove
13 slit
131 closed end part
14 vehicle body front side end face
15A outer peripheral surface
15B inner peripheral surface
16A, 16B abutting surface
17A, 17B abutting surface
18A, 18B recessed part
19 clamp part
19A, 19B inclined part
2 inner column
3 vehicle body attaching bracket (upper bracket)
31A, 31B flange parts
311A, 311B abutting surface
312A, 312B bolt
32A, 32B side plate
321A, 321B inner surface
322A, 322B outer surface
33A, 33B tilting long groove
34 fastening rod
341 head part
342 chamfered part
343 end face
344 male screw
35 nut
351 end face
36 operating lever
37 washer
38 bolt
4 steering shaft
41 steering wheel
5 electric power steering device
51 bracket
52 output shaft
6 vehicle body
61 vehicle body attaching bracket (lower bracket)
62 tilting central shaft
1001 outer column
1011A, 1011B clamp part
1012A, 1012B telescopic long groove
1013 slit
1131 closed end part
1015A outer peripheral surface
1015B inner peripheral surface
1016A, 1016B abutting surface
1017A, 1017B abutting surface
1018A, 1018B recessed part
1002 inner column
1003 vehicle body attaching bracket (upper bracket)
1031A, 1031B flange parts
1311A, 1311B abutting surface
1312A, 1312B bolt
1032A, 1032B side plate
1321A, 1321B inner surface
1322A, 1322B outer surface
1033A, 1033B tilting long groove
1034 fastening rod
1341 head part
1342 chamfered part
1343 end face
1344 male screw
1035 nut
1351 end face
1036 operating lever
1037 washer
1038 bolt
1391 thrust bearing
1392 movable cam
1393 fixed cam
1004 steering shaft
1041 steering wheel
1005 electric power steering device
1051 bracket
1052 output shaft
1006 vehicle body
1061 vehicle body attaching bracket (lower bracket)
1062 central axis of tilting
1071A, 1071B, 1072A, 1072B protruding part
1711A, 1711B, 1721A, 1721B abutting surface
1073A protruding part
1074A, 1074B, 1074C, 1074D through hole 1075A, 1075B protruding part

BEST MODE FOR CARRYING OUT THE INVENTION

Now, by referring to the drawings, a first embodiment to an eighth embodiment of the present invention will be described below.

FIRST EMBODIMENT

Figure 2:
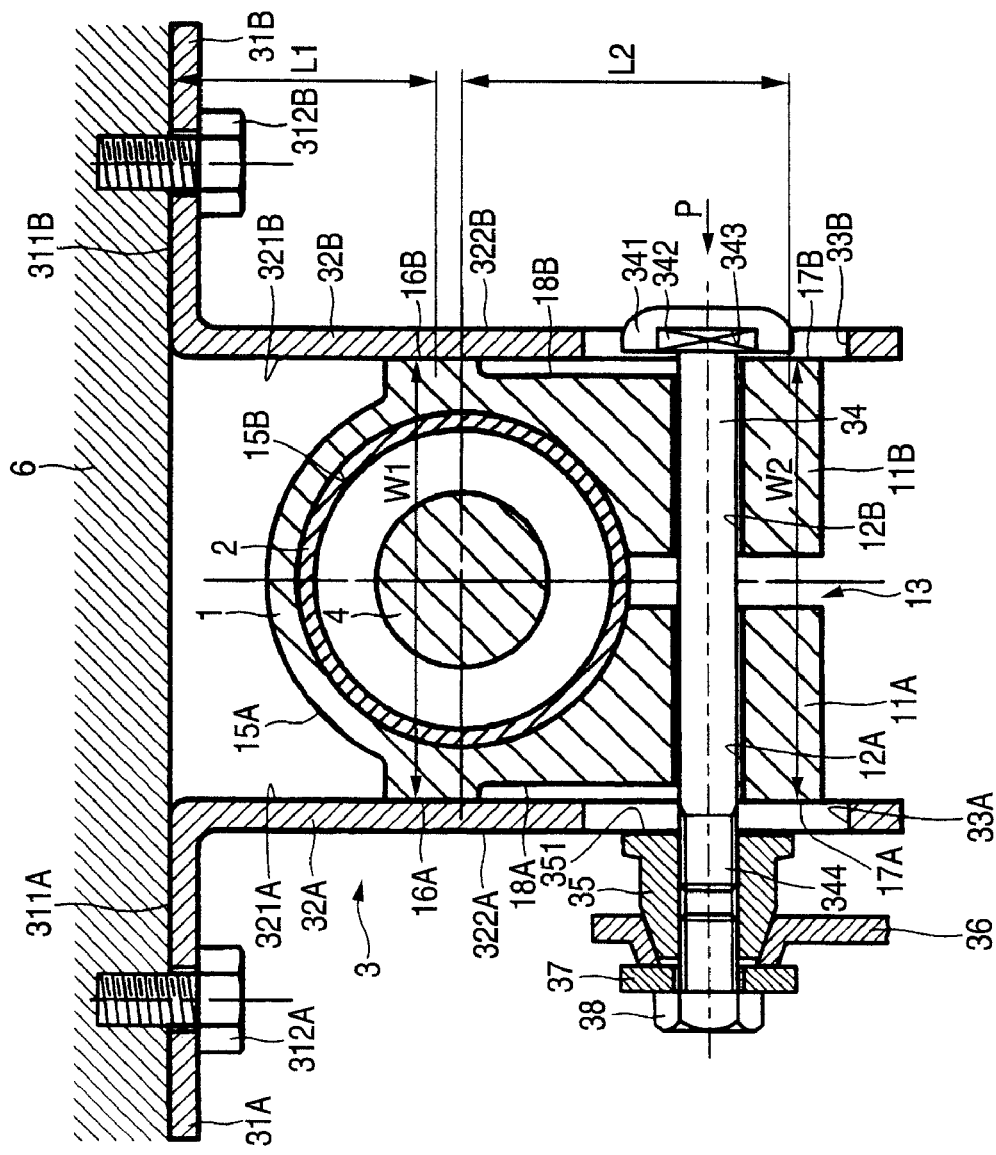
FIG. 2(A) is an enlarged sectional view taken along a line A-A of FIG. 1.
FIG. 2(B) is a view seen from an arrow P of FIG. 2(A).
Figure 3:
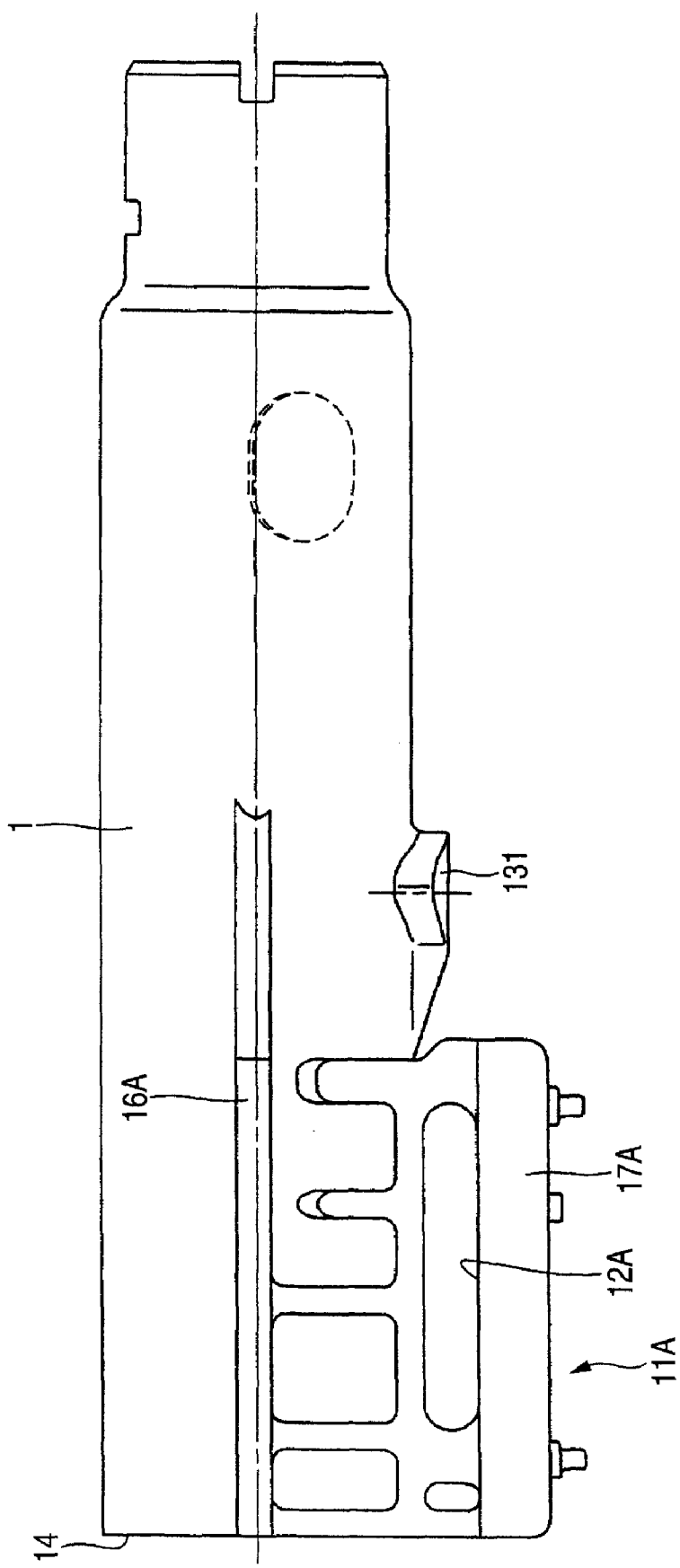
FIG. 3 is a diagram of parts showing a simple substance of an outer column shown in FIG. 1.

FIG. 1 is an entire front view showing a steering device of a first embodiment of the present invention, FIG. 2(A) is an enlarged sectional view taken along a line A-A of FIG. 1. FIG. 2(B) is a view seen from an arrow P of FIG. 2(A). FIG. 3 is a diagram of parts showing a simple substance of an outer column shown in FIG. 1.

In a hollow cylindrical outer column 1, a steering shaft 4 to which a steering wheel 41 is attached in the rear side of a vehicle body (a right side of FIG. 1) is supported so as to freely rotate. The outer column 1 is integrally formed by a die cast molding method in which molten metal such as aluminum alloy, magnesium alloy or the like is poured into a mold under applying pressure.

To a cylindrical inner peripheral surface 15B (see FIG. 2(A)) formed in a part of the outer column 1 in the front side of the vehicle body (a left side of FIG. 1), an inner column 2 is internally fitted so as to axially slide (so that a telescopic position can be adjusted). The outer column 1 is attached to the vehicle body 6 by a vehicle body attaching bracket (an upper bracket). In FIG. 1, the inner column 2 is arranged in the front side of the vehicle body and the outer column 1 is arranged in the rear side of the vehicle body, however, the inner column 2 may be arranged in the rear side of the vehicle body and the outer column 1 may be arranged in the front side of the vehicle body.

To a part of the inner column 2 in the front side of the vehicle body, an electric power steering device 5 is attached. A bracket 51 formed integrally with the electric power steering device 5 is supported by a vehicle body attaching bracket (a lower bracket) 61 fixed to the vehicle body 6 so as to pivotally movable through a tilting central shaft 62. The electric power steering device 5 detects a steering torque of the steering shaft 4 to apply a steering assist force proportional to the steering torque to an output shaft 52.

As shown in FIG. 2(A), on the upper part of the vehicle body attaching bracket 3, a pair of right and left flange parts 31A and 31B for attaching the vehicle body attaching bracket 3 to the vehicle body 6 is formed. The flange parts 31A and 31B are fastened to the vehicle body 6 by bolts 312A and 312B and abutting surfaces 311A and 311B on the upper surface of the flange parts 31A and 31B abut on the vehicle body 6 and are fixed thereto. In the flange parts 31A and 31B, a pair of right and left side plates 32A and 32B are bent in L shapes and extends downwardly from the flange parts 31A and 31B.

Between the inner surfaces 321A and 321B of the side plates 32A and 325, the side surfaces of the outer column 1 and the side surfaces of clamp parts 11A and 11B integrally formed downward from the outer column 1 are held so as to achieve telescopic movement and tilting movement.

In the lower surface of the outer column 1 and the lower surfaces of the clamp parts 11A and 11B, a slit 13 is formed so as to pass through from the outer peripheral surface 15A to the inner peripheral surface 15B of the outer column 1. An end part of the slit 13 in the front side of the vehicle body (a left side of FIG. 3) is opened to an end face 14 of the outer column 1 in the front side of the vehicle body. An end part of the slit 13 in the rear side of the vehicle (a right side of FIG. 3) is extended to a substantially intermediate position of the axial length of the outer column 1 and a semi-circular arc shaped closed end part 131 is formed.

In the clamp parts 11A and 11B, telescopic long grooves 12A and 123 extending in the axial direction of the outer column 1 are formed in the lower part of the axis of the outer column 1. Further, a fastening rod 34 is inserted into tilting long grooves 33A and 333 formed in the side plates 32A and 32B and the telescopic long grooves 12A and 12B from the right side of FIG. 2(A) (intersecting at right angles to the axis of the outer column 1).

As shown in FIGS. 2(A) and 2(B), in the right side of the fastening rod 34, a disk shaped head part (a fastening member) 341 is formed. In the outer periphery of the head part 341, chamfered parts 342 and 342 are formed in parallel. The chamfered part 342 is internally fitted to the tilting long groove 33B to prevent the fastening rod 34 from rotating relative to the vehicle body attaching bracket 3 and tilt the fastening rod 34 along the long tilting groove 33B.

An end face 343 of the head part 341 abuts on an outer surface 322B of the side plate 32B. In a left side of the fastening rod 34, a male screw 344 is formed. To the male screw 344, a cylindrical nut (a fastening member) 35 is screwed. An end face 351 of the nut 35 abuts on an outer surface 322A of the side plate 32A. To the nut 35, an operating lever 36 is fixed through a washer 37 and a bolt 38.

In right and left side surfaces of the outer column 1, abutting surfaces 16A and 16B are formed in the vicinity of the axis of the outer column 1 (as shown in FIG. 1, in the vicinity of the axis of the outer column 1 when the steering device is viewed from a side part). The abutting surfaces 16A and 16B have small spaces between the inner surfaces 321A and 321B of the side plates 32A and 32B and the attaching surfaces 16A and 16B when the fastening rod 34 is unfastened, and can abut on the inner surfaces 321A and 321B of the side plates 32A and 32B when the fastening rod 34 is fastened.

Further, the abutting surfaces 16A and 16B are extended from the end face 14 of the outer column 1 in the front side of the vehicle body to a part in the rear side of the vehicle body and formed to positions slightly passing the ends of the telescopic long grooves 12A and 12B in the rear side of the vehicle body as shown in FIG. 3. Accordingly, the abutting surfaces 16A and 16B can abut on the inner surfaces 321A and 321B of the side plates 32A and 32B over the entire length of a telescopic position adjusting range of the outer column 1.

Further, in side surfaces of the clamp parts 11A and 11B respectively, abutting surfaces 17A and 17B are formed in the vicinity of the axis of the fastening rod 34. The abutting surfaces 17A and 17B may lightly abut on the inner surfaces 321A and 321B of the side plates 32A and 32B, even when the fastening rod 34 is unfastened. When viewed from the right side of FIG. 2(A), the end face 343 of the head part 341 of the fastening rod 34 is overlapped on the abutting surface 17B. Further, when viewed from the left side of FIG. 2(A), the end face 351 of the nut 35 is overlapped on the abutting surface 17A.

Further, the abutting surfaces 16A and 17A may be axially continuously arranged as shown in FIG. 3, or axially intermittently arranged. Further, when the abutting surfaces 16A and 17A abut on the side plates 32A and 32B in the telescopic position adjusting range, the abutting surfaces may be simple protruding parts that are not extended in the axial direction.

Further, as shown in FIG. 2(A), a width W1 from the abutting surface 16A to the abutting surface 16B of the outer column 1 is formed to be equal to or wider than a width W2 from the abutting surface 17A to the abutting surface 17B of the clamp parts 11A, 11B. Further, the abutting surfaces 16A and 16B, and 17A and 17B are formed at two positions including a position in the vicinity of the axis of the fastening rod and a position spaced vertically from the axis of the fastening rod in the direction (a vertical direction in FIG. 2(A)) intersecting at right angles to the axis of the column.

Further, the abutting surfaces 17A and 17B are extended from the end face 14 of the outer column 1 in the front side of the vehicle body to a part in the rear side of the vehicle body and formed to positions slightly passing the ends of the telescopic long grooves 12A and 12B in the rear side of the vehicle body as shown in FIG. 3. Accordingly, the abutting surfaces 17A and 17B can abut on the inner surfaces 321A and 321B of the side plates 32A and 32B over the entire length of the telescopic position adjusting range of the outer column 1.

Further, recessed parts 18A and 18B are formed from the right and left side surfaces of the outer column 1 to the right and left side surfaces of the clamp parts 11A and 11B. The recessed parts 18A and 18B are formed between the abutting surfaces 17A and 17B in the vicinity of the axis of the fastening rod 34 and the abutting surfaces 16A and 16B in the vicinity of the axis of the outer column 1. The recessed parts 18A and 18B are formed to be recessed from the abutting surfaces 17A, 17B, 16A and 16B. The recessed parts 18A and 18B are extended from the end face 14 of the outer column 1 in the front side of the vehicle body to a part in the rear side of the vehicle body and formed to positions slightly passing the ends of the telescopic long grooves 12A and 12B in the rear side of the vehicle body as shown in FIG. 3.

When swinging the operating lever 36, the nut 35 rotates so that the side plates 32A and 32B is fastened through the fastening rod 34 or a fastening state is released. That is, when the operating lever 36 is swung in a fastening direction, the nut 35 rotates and the end face 351 of the nut 35 moves to a right side of FIG. 2(A) and the fastening rod 34 moves to a left side of FIG. 2(A).

As a result, the end face 351 of the nut 35 fastens the outer surface 322A of the side plate 32A and the end face 343 of the head part 341 fastens the outer surface 322B of the side plate 32B. Thus, the inner surfaces 321A and 321B of the side plates 32A and 32B strongly press the abutting surfaces 17A and 17B in the vicinity of the axis of the fastening rod 34 to deform the clamp parts 11A and 11B toward the axis of the outer column 1 and narrow the width of the slit 13.

Further, when swinging the operating lever 36 in a fastening direction, the side plates 32A and 32B are more deformed toward the axis of the outer column 1. As described above, the recessed parts 18A and 18B are formed from the right and left side surfaces of the outer column 1 to the right and left side surfaces of the clamp parts 11A and 11B. Accordingly, the inner surfaces 321A and 321B of the side plates 32A and 32B abut on the abutting surfaces 16A and 16B in the vicinity of the axis of the outer column 1 to strongly press the inner surfaces 321A and 321B to the abutting surfaces 16A and 16B in the vicinity of the axis and more deform the outer column 1 toward the axis of the outer column 1.

As a result, the diameter of the inner peripheral surface 15B of the outer column 1 is reduced to strongly fasten the outer column 1 to inner column 2. At the same time, both the abutting surfaces 16A and 16B in the vicinity of the axis of the outer column 1 and the abutting surfaces 17A and 173 in the vicinity of the axis of the fastening rod 34 are strongly fastened by the inner surfaces 321A and 321B of the side plates 32A and 32B.

Accordingly, the axis of the outer column 1 is considered to be a fulcrum point, a center of the abutting parts of the abutting surfaces 17A and 17B in the vicinity of the axis of the fastening rod 34 and the inner surfaces 321A and 321B is considered to be a power point, and the clamp parts 11A and 11B are fastened by a moment proportional to a distance L2 between the fulcrum point and the power point. Therefore, the outer column 1 can be strongly pressed to the inner column 2.

Further, the abutting surfaces 16A and 16B in the vicinity of the axis of the outer column 1 are also strongly fastened by the inner surfaces 321A and 321B of the side plates 32A and 32B. Accordingly, a distance L1 between the center of the abutting parts of the abutting surfaces 16A and 16B of the outer column 1 and the inner surfaces 321A and 321B of the side plates 32A and 32B and the abutting surfaces 311A and 311B of the flange parts 31A and 31B of the vehicle body attaching bracket 3 and the vehicle body 6 is shorter than that of a conventional steering device.

Accordingly, when a steering force is applied to the outer column 1 from the steering wheel 41, in a moment applied to the vehicle body attaching bracket 3 by this steering force, the abutting surfaces 311A and 311B of the flange parts 31A and 31B and the vehicle body 6 are considered to be a fulcrum point. Further, a center of the abutting parts of the abutting surfaces 16A and 16B in the vicinity of the axis of the outer column 1 and the inner surfaces 321A and 321B are considered to be a power point. A moment proportional to the distance L1 between the fulcrum point and the power point acts on the vehicle body attaching bracket 3. Accordingly, a rightward and leftward supporting rigidity in FIG. 2(A) is especially improved relative to the steering force applied to the outer column 1.

SECOND EMBODIMENT

Figure 4:
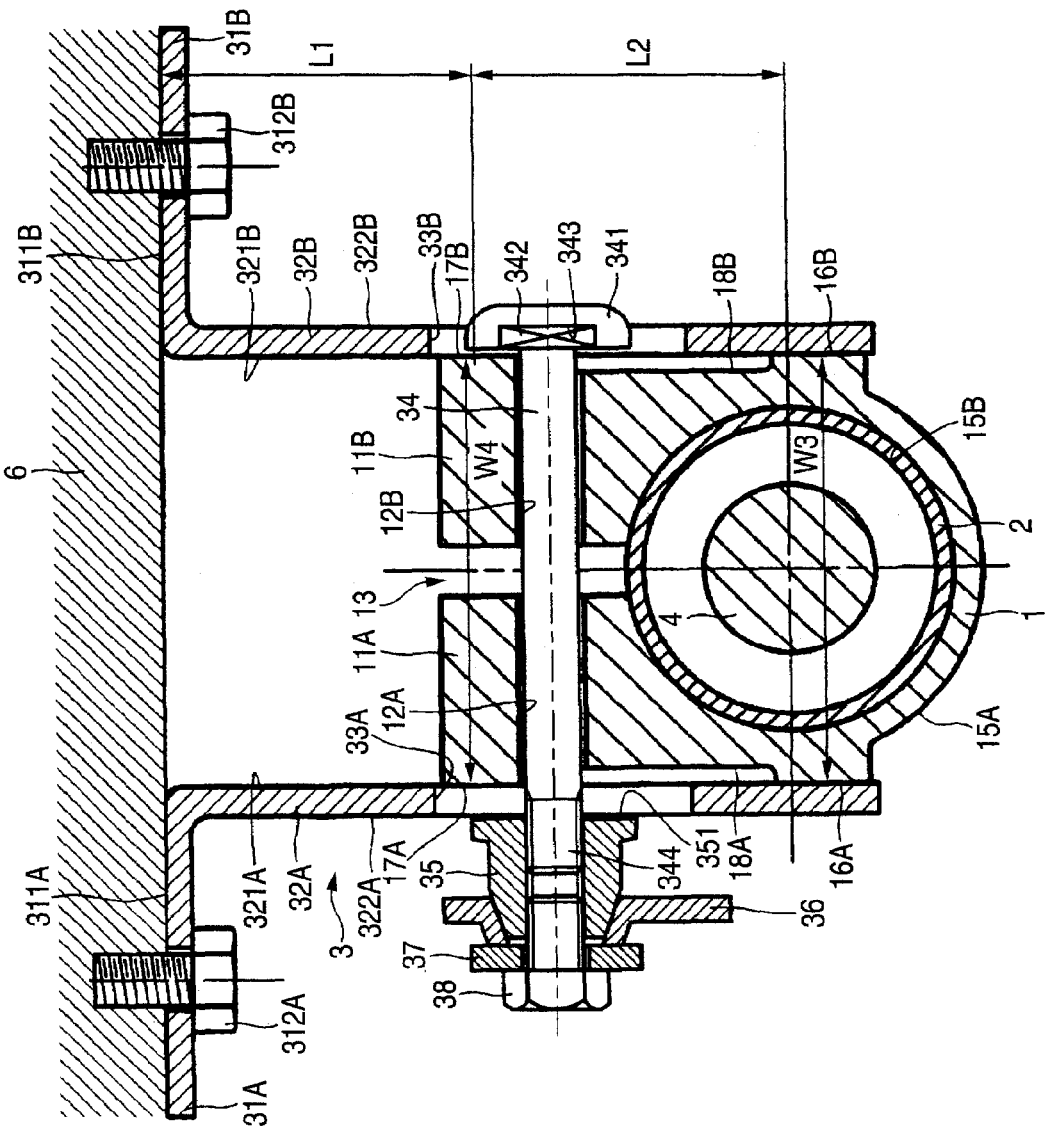
FIG. 4 is an enlarged sectional view showing a steering device of a second embodiment of the present invention and corresponding to the enlarged sectional view taken along a line A-A of FIG. 1.

Now, a second embodiment of the present invention will be described below FIG. 4 is an enlarged sectional view showing a steering device of a second embodiment of the present invention and corresponding to the enlarged sectional view taken along a line A-A of FIG. 1. In a below-described explanation, only structural parts different from those of the first embodiment will be described and a duplicated explanation will be omitted. The same parts as those of the first embodiment are designated by the same reference numerals and described.

The second embodiment is a modified embodiment of the first embodiment in which a fastening rod 34 is arranged between the axis of an outer column 1 and a vehicle body 6. Namely, as shown in FIG. 4, between the inner surfaces 321A and 321B of side plates 32A and 32B of a vehicle body attaching bracket 3, the side surfaces of the outer column 1 and the side surfaces of clamp parts 11A and 11B integrally formed upward from the outer column 1 are held so as to achieve telescopic movement and tilting movement.

In the upper surface of the outer column 1 and the upper surfaces of the clamp parts 11A and 11B, a slit 13 is formed so as to pass through from the outer peripheral surface 15A to the inner peripheral surface 15B of the outer column 1.

In the clamp parts 11A and 11B, telescopic long grooves 12A and 12B extending in the axial direction of the outer column 1 are formed in the upper part of the axis of the outer column 1. Further, a fastening rod 34 is inserted into tilting long grooves 33A and 33B formed in the side plates 32A and 32B and the telescopic long grooves 12A and 12B from the right side of FIG. 4 (intersecting at right angles to the axis of the outer column 1).

In the right side of the fastening rod 34, a disk shaped head part (a fastening member) 341 is formed. In the outer periphery of the head part 341, chamfered parts 342 and 342 are formed in parallel. The chamfered part 342 is internally fitted to the tilting long groove 33B to prevent the fastening rod 34 from rotating relative to the vehicle body attaching bracket 3 and tilt the fastening rod 34 along the long tilting groove 33B.

An end face 343 of the head part 341 abuts on an outer surface 322B of the side plate 32B. In a left side of the fastening rod 34, a male screw 344 is formed. To the male screw 344, a cylindrical nut (a fastening member) 35 is screwed. An end face 351 of the nut 35 abuts on an outer surface 322A of the side plate 32A. To the nut 35, an operating lever 36 is fixed through a washer 37 and a bolt 38.

In right and left side surfaces of the outer column 1, abutting surfaces 16A and 16B are formed in the vicinity of the axis of the outer column 1. The abutting surfaces 16A and 16B have small spaces between the inner surfaces 321A and 321B of the side plates 32A and 32B and the attaching surfaces 16A and 16B when the fastening rod 34 is unfastened, and can respectively abut on the inner surfaces 321A and 321B of the side plates 32A and 32B when the fastening rod 34 is fastened. When viewed from the right and left sides of FIG. 4, the axis of the outer column 1 is overlapped on the abutting surfaces 16A and 16B Further, the abutting surfaces 16A and 16B can abut on the inner surfaces 321A and 321B of the side plates 32A and 32B over the entire length of a telescopic position adjusting range of the outer column 1 similarly to the first embodiment.

Further, in side surfaces of the clamp parts 11A and 11B respectively, abutting surfaces 17A and 17B are formed in the vicinity of the axis of the fastening rod 34. The abutting surfaces 17A and 17B lightly abut on the inner surfaces 321A and 321B of the side plates 32A and 32B, even when the fastening rod 34 is unfastened. When viewed from the right side of FIG. 4, the end face 343 of the head part 341 of the fastening rod 34 is overlapped on the abutting surface 17B. Further, when viewed from the left side of FIG. 4, the end face 351 of the nut 35 is overlapped on the abutting surface 17A.

Further, the abutting surfaces 17A and 17B can abut on the inner surfaces 321A and 321B of the side plates 32A and 32B over the entire length of the telescopic position adjusting range of the outer column 1 like the first embodiment.

Further, as shown in FIG. 4, a width W3 from the abutting surface 16A to the abutting surface 16B of the outer column 1 is formed to be equal to or wider than a width W4 from the abutting surface 17A to the abutting surface 17B of the outer column 1.

Further, recessed parts 18A and 18B are formed from the right and left side surfaces of the outer column 1 to the right and left side surfaces of the clamp parts 11A and 11B. The recessed parts 18A and 18B are formed between the abutting surfaces 17A and 17B in the vicinity of the axis of the fastening rod 34 and the abutting surfaces 16A and 16B in the vicinity of the axis of the outer column 1 and recessed more than the abutting surfaces 17A, 17B, 16A and 16B. The recessed parts 18A and 18B are formed over the entire length of the telescopic position adjusting range of the outer column 1 like the first embodiment.

When swinging the operating lever 36, the nut 35 rotates so that the side plates 32A and 32B can be fastened through the fastening rod 34 or a fastening state is released. That is, when the operating lever 36 is swung in a fastening direction, the nut 35 rotates and the end face 351 of the nut 35 moves to a right side of FIG. 4 and the fastening rod 34 moves to a left side of FIG. 4.

As a result, the end face 351 of the nut 35 fastens the outer surface 322A of the side plate 32A and the end face 343 of the head part 341 fastens the outer surface 322B of the side plate 32B. Thus, the inner surfaces 321A and 321B of the side plates 32A and 32B strongly press the abutting surfaces 17A and 17B in the vicinity of the axis of the fastening rod 34 to deform the clamp parts 11A and 11B toward the axis of the outer column 1 and narrow the width of the slit 13.

Further, when swinging the operating lever 36 in the fastening direction, the side plates 32A and 32B are more deformed toward the axis of the outer column 1. As described above, the recessed parts 18A and 18B are formed from the right and left side surfaces of the outer column 1 to the right and left side surfaces of the clamp parts 11A and 11B. Accordingly, the inner surfaces 321A and 321B of the side plates 32A and 32B abut on the abutting surfaces 16A and 16B in the vicinity of the axis of the outer column 1 to strongly press the inner surfaces 321A and 3213 to the abutting surfaces 16A and 16B in the vicinity of the axis and more deform the outer column 1 toward the axis of the outer column 1.

As a result, the diameter of the inner peripheral surface 15B of the outer column 1 is reduced to strongly fasten the outer column 1 to an inner column 2. At the same time, both the abutting surfaces 16A and 16B in the vicinity of the axis of the outer column 1 and the abutting surfaces 17A and 17B in the vicinity of the axis of the fastening rod 34 are strongly fastened by the inner surfaces 321A and 321B of the side plates 32A and 32B.

Accordingly, the axis of the outer column 1 is considered to be a fulcrum point, a center of the abutting parts of the abutting surfaces 17A and 17B in the vicinity of the axis of the fastening rod 34 and the inner surfaces 321A and 3213 is considered to be a power point, the clamp parts 11A and 11B are fastened by a moment proportional to a distance L2 between the fulcrum point and the power point. Therefore, the outer column 1 can be strongly pressed to the inner column 2.

Further, the abutting surfaces 17A and 17B in the vicinity of the axis of the fastening rod 34 are strongly fastened by the inner surfaces 321A and 321B of the side plates 32A and 32B. Accordingly, a distance L1 between the center of the abutting parts of the abutting surfaces 17A and 17B in the vicinity of the axis of the fastening rod 34 and the inner surfaces 321A and 321B and the abutting surfaces 311A and 311B of the flange parts 31A and 31B of the vehicle body attaching bracket 3 and a vehicle body 6 is shorter than that of a conventional steering device.

Accordingly, when a steering force is applied to the outer column 1 from a steering wheel 41, in a moment applied to the vehicle body attaching bracket 3 by this steering force, the abutting surfaces 311A and 311B of the flange parts 31A and 31B and the vehicle body 6 are considered to be a fulcrum point. Further, the center of the abutting parts of the abutting surfaces 17A and 17B in the vicinity of the axis of the fastening rod 34 and the inner surfaces 321A and 321B are considered to be a power point. A moment proportional to the distance L1 between the fulcrum point and the power point acts on the vehicle body attaching bracket 3. Accordingly, a rightward and leftward supporting rigidity in FIG. 4 is especially improved relative to the steering force applied to the outer column 1.

THIRD EMBODIMENT

Figure 5:
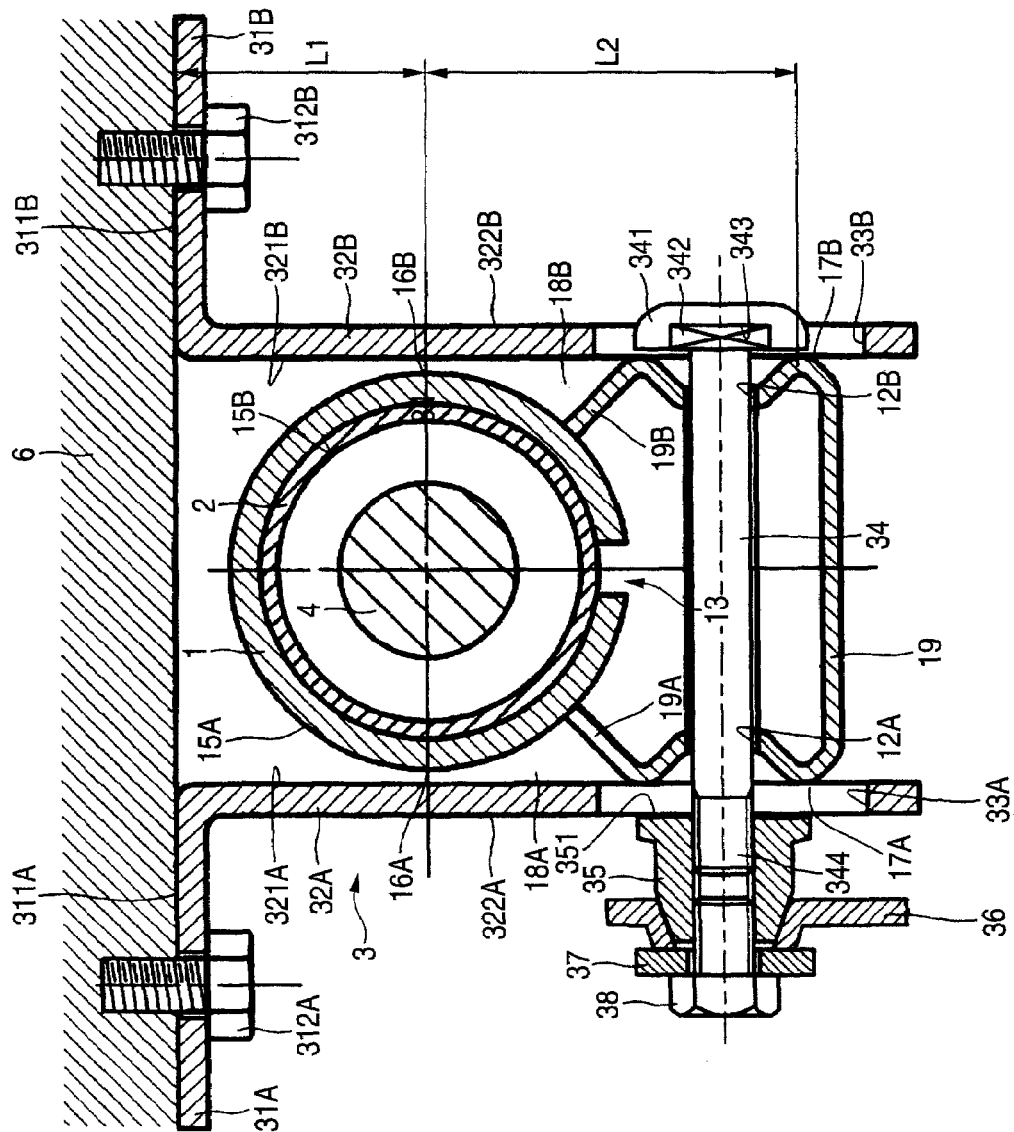
FIG. 5 is an enlarged sectional view showing a steering device of a third embodiment of the present invention and corresponding to the enlarged sectional view taken along a line A-A of FIG. 1.

Now, a third embodiment of the present invention will be described below. FIG. 5 is an enlarged sectional view showing a steering device of a third embodiment of the present invention and corresponding to the enlarged sectional view taken along a line A-A of FIG. 1. In a below-described explanation, only structural parts different from those of the above-described embodiments will be described and a duplicated explanation will be omitted. The same parts as those of the above-described embodiments are designated by the same reference numerals and described.

In the first embodiment, the outer column 1 and the clamp parts 11A and 11B are integrally formed by a die casting method. The second embodiment is an example in which the clamp parts 11A and 11B are formed separately from the outer column 1

As shown in FIG. 5, an outer column 1 is formed with a cylindrical steel pipe and clamp parts 19 made of a separately formed plate and formed in U-shapes are attached to a lower surface of the outer column 1 by welding.

Between the inner surfaces 321A and 321B of side plates 32A and 32B of a vehicle body attaching bracket 3, the side surfaces of the outer column 1 and the side surfaces of the clamp parts 19 welded to the lower surface of the outer column 1 are held so as to achieve telescopic movement and tilting movement.

In the lower surface of the outer column 1, a slit 13 is formed so as to pass through from the outer peripheral surface 15A to the inner peripheral surface 15B of the outer column 1. In the clamp parts 19, telescopic long grooves 12A and 12B extending in the axial direction of the outer column 1 are formed in the lower part of the axis of the outer column 1. Further, a fastening rod 34 is inserted into tilting long grooves 33A and 33B formed in the side plates 32A and 32B and the telescopic long grooves 12A and 12B from the right side of FIG. 5 (intersecting at right angles to the axis of the outer column 1).

As shown in FIG. 5, in the right side of the fastening rod 34, a disk shaped head part (a fastening member) 341 is formed. In the outer periphery of the head part 341, chamfered parts 342 and 342 are formed in parallel. The chamfered part 342 is internally fitted to the tilting long groove 33B to prevent the fastening rod 34 from rotating relative to the vehicle body attaching bracket 3 and tilt the fastening rod 34 along the long tilting groove 33B.

An end face 343 of the head part 341 abuts on an outer surface 322B of the side plate 32B. In a left side of the fastening rod 34, a male screw 344 is formed. To the male screw 344, a cylindrical nut (a fastening member) 35 is screwed. An end face 351 of the nut 35 abuts on an outer surface 322A of the side plate 32A. To the nut 35, an operating lever 36 is fixed through a washer 37 and a bolt 38.

When the fastening rod 34 is fastened, abutting surfaces 16A and 16B at right and left parts of the cylindrical outer peripheral surface 15A of the outer column 1 can abut on the inner surfaces 321A and 321B of the side plates 32A and 32B. Further, when the fastening rod 34 is unfastened, the abutting surfaces 16A and 16B are formed so as to have a little space (0.1 mm to 0.2 mm) between the inner surfaces 321A and 321B of the side plates 32A and 32B and the abutting surfaces 16A and 16B. The abutting surfaces 16A and 16B are located on intersections of a horizontal line passing the axis of the outer column 1 and extending in the horizontal direction and the outer peripheral surface 15A of the outer column 1.

Further, the abutting surfaces 16A and 16B can abut on the inner surfaces 321A and 321B of the side plates 32A and 32B over the entire length of a telescopic position adjusting range of the outer column 1 similarly to the first embodiment.

Further, in right and left side surfaces of the clamp parts 19 respectively, abutting surfaces 17A and 17B are formed in the vicinity of the axis of the fastening rod 34. The abutting surfaces 17A and 17B lightly abut on the inner surfaces 321A and 321B of the side plates 32A and 32B, even when the fastening rod 34 is unfastened.

The abutting surfaces 17A and 17B are provided with recessed parts (see in FIG. 5) in the vicinity of the axis of the fastening rod 34 to abut on the inner surfaces 321A and 321B of the side plates 32A and 32B at two upper and lower parts of the axis of the fastening rod 34. The abutting surfaces 17A and 17B may not be provided with the recessed parts and may be formed to be plane.

The abutting surfaces 17A and 17B can abut on the inner surfaces 321A and 321B of the side plates 32A and 32B throughout the entire length of the telescopic position adjusting range of the outer column 1 like the first embodiment.

Further, recessed parts 18A and 18D are formed between the abutting surfaces 17A and 17B in the vicinity of the axis of the fastening rod 34 and the abutting surfaces 16A and 16B of the outer column 1. The recessed parts 18A and 18B are formed to be recessed more than the abutting surfaces 17A, 17B 16A and 16B.

The recessed parts 18A and 18B are formed by a space surrounded by the outer peripheral surface 15A formed below the abutting surfaces 16A and 16B, inclined parts 19A and 19B at the upper ends of the clamp parts 19 and the inner surfaces 321A and 321B of the side plates 32A and 32B. The recessed parts 18A and 18B are formed over the entire length of the telescopic position adjusting range of the outer column 1 like the first embodiment.

When the operating lever 36 is swung in a fastening direction, the inner surfaces 321A and 321B of the side plates 32A and 32B strongly press the abutting surfaces 17A and 17B in the vicinity of the axis of the fastening rod 34 to deform the clamp parts 19 toward the axis of the outer column 1 and narrow the width of the slit 13.

Further, when the operating lever 36 is swung in the fastening direction, the side plates 32A and 32B are more deformed toward the axis of the outer column 1. As described above, the recessed parts 18A and 18B are formed from the outer peripheral surface 15A below the abutting surfaces 16A and 16B of the outer column 1 to the inclined parts 19A and 19B at the upper ends of the clamp parts 19. Accordingly, the inner surfaces 321A and 321B of the side plates 32A and 32B abut on the abutting surfaces 16A and 16B of the side surfaces of the outer column 1 to strongly press the inner surfaces 321A and 321B to the abutting surfaces 16A and 16B and more deform the outer column 1 toward the axis of the outer column 1.

As a result, the diameter of the inner peripheral surface 15B of the outer column 1 is reduced to strongly fasten the outer column 1 to an inner column 2. At the same time, both the abutting surfaces 16A and 16B in the side surfaces of the outer column 1 and the abutting surfaces 17A and 17B in the vicinity of the axis of the fastening rod 34 are strongly fastened by the inner surfaces 321A and 321B of the side plates 32A and 32B.

Accordingly, the abutting surfaces 16A and 16B passing the axis of the outer column 1 are considered to be a fulcrum point, a center of the abutting parts of the abutting surfaces 17A and 17B in the vicinity of the axis of the fastening rod 34 and the inner surfaces 321A and 321B is considered to be a power point, and the clamp parts 19 are fastened by a moment proportional to a distance L2 between the fulcrum point and the power point. Therefore, the outer column 1 can be strongly fastened to the inner column 2.

Further, the abutting surfaces 16A and 16B passing the axis of the outer column 1 are also strongly fastened by the inner surfaces 321A and 321B of the side plates 32A and 32B. Accordingly, a distance L1 between the center of the abutting parts of the abutting surfaces 16A and 16B of the outer column 1 and the inner surfaces 321A and 321B and the abutting surfaces 311A and 311B of the flange parts 31A and 31B of the vehicle body attaching bracket 3 and a vehicle body 6 is shorter than that of a conventional steering device.

Accordingly, when a steering force is applied to the outer column 1 from a steering wheel 41, in a moment applied to the vehicle body attaching bracket 3 by this steering force, the abutting surfaces 311A and 311B of the flange parts 31A and 31B and the vehicle body 6 are considered to be a fulcrum point. Further, the center of the abutting parts of the abutting surfaces 16A and 16B in the vicinity of the axis of the outer column 1 and the inner surfaces 321A and 321B is considered to be a power point. A moment proportional to the distance L1 between the fulcrum point and the power point acts on the vehicle body attaching bracket 3. Accordingly, a rightward and leftward supporting rigidity in FIG. 5 is especially improved relative to the steering force applied to the outer column 1.

FOURTH EMBODIMENT

Figure 6:
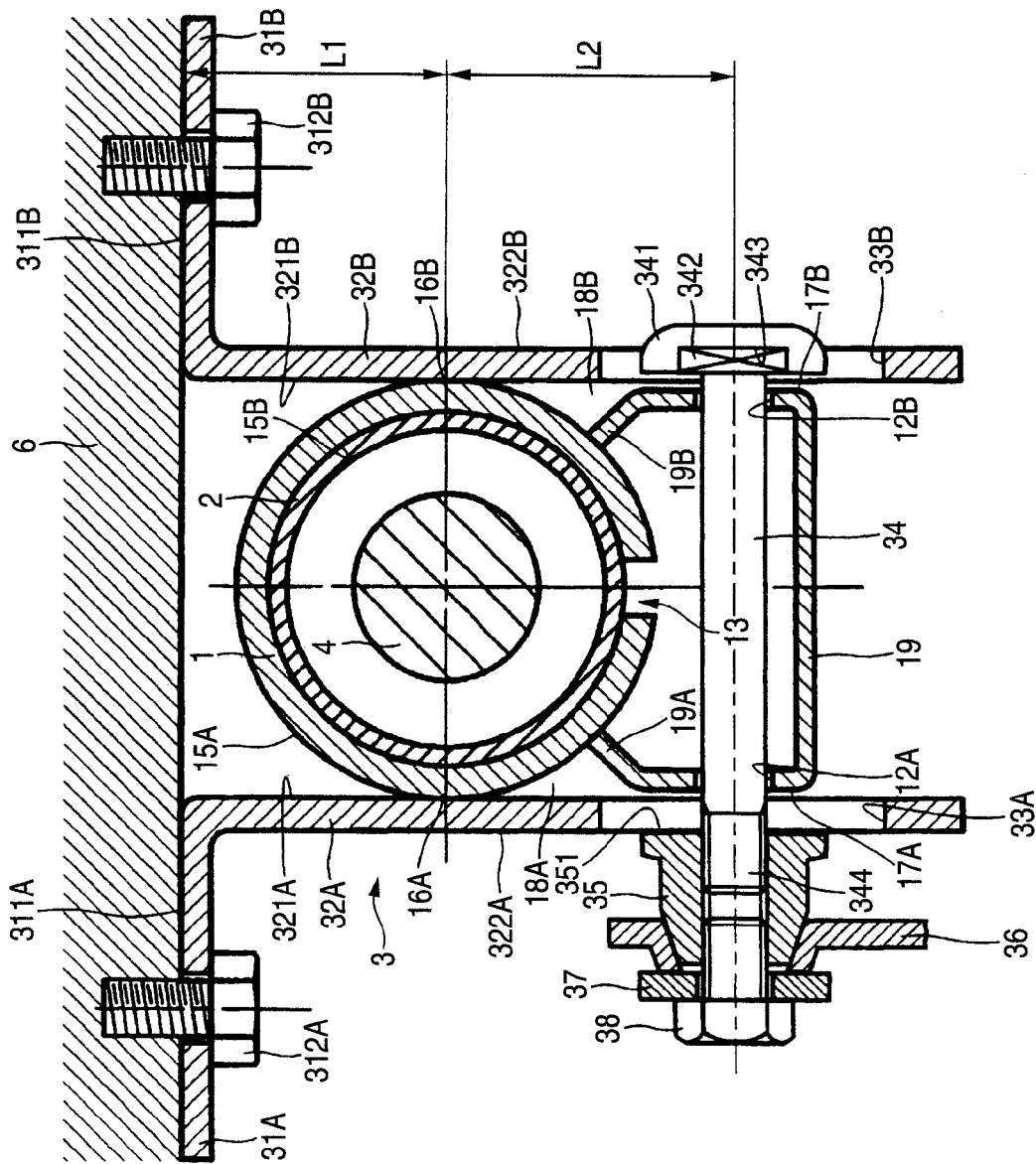
FIG. 6 is an enlarged sectional view showing a steering device of a fourth embodiment of the present invention and corresponding to the enlarged sectional view taken along a line A-A of FIG. 1.
Figure 7:
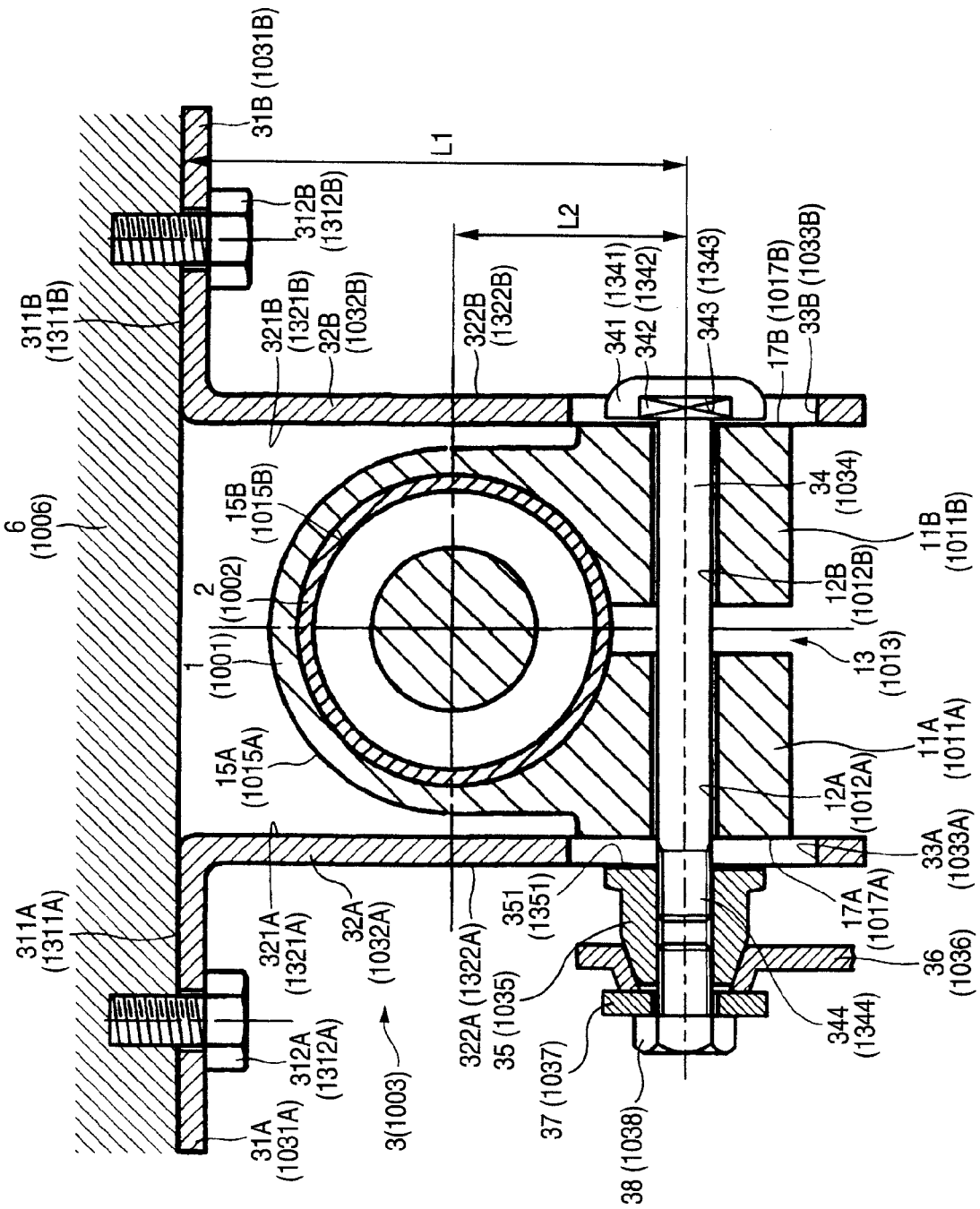
FIG. 7 is an enlarged sectional view showing a conventional steering device.

Now, a fourth embodiment of the present invention will be described below FIG. 6 is an enlarged sectional view showing a steering device of a fourth embodiment of the present invention and corresponding to the enlarged sectional view taken along a line A-A of FIG. 1. In a below-described explanation, only structural parts different from those of the above-described embodiments will be described and a duplicated explanation will be omitted. The same parts as those of the above-described embodiments are designated by the same reference numerals and described.

The fourth embodiment is a modified embodiment of the third embodiment and a clamp part 19 is formed separately from an outer column 1 like the third embodiment. In this embodiment, a difference from the third embodiment resides in that when a fastening rod 34 is unfastened, spaces are formed between abutting surfaces 17A and 17B of right and left side surfaces of the clamp part 19 and inner surfaces 321A and 321B of side plates 32A and 32B.

As shown in FIG. 6, in the fourth embodiment, the outer column 1 is formed with a cylindrical steel pipe and the clamp part 19 made of a separately formed plate and formed in a U shape is attached to a lower surface of the outer column 1 by welding.

Between the inner surfaces 321A and 321B of the side plates 32A and 32B of a vehicle body attaching bracket 3, the side surfaces of the outer column 1 and the side surfaces of the clamp part 19 welded to the lower surface of the outer column 1 are held so as to achieve telescopic movement and tilting movement.

When the fastening rod 34 is fastened, abutting surfaces 16A and 16B at right and left parts of the cylindrical outer peripheral surface 15A of the outer column 1 are strongly pressed to the inner surfaces 321A and 321B of the side plates 32A and 32B. Contrary to the third embodiment, in the fourth embodiment, even when the fastening rod 34 is unfastened, the abutting surfaces 16A and 16B lightly abut on the inner side surfaces 321A and 321B of the side plates 32A and 32B. The abutting surfaces 16A and 16B are located on intersections of a horizontal line passing the axis of the outer column 1 and extending in the horizontal direction in FIG. 6 and the outer peripheral surface 15A of the outer column 1.

The abutting surfaces 16A and 16B can abut on the inner surfaces 321A and 321B of the side plates 32A and 32B over the entire length of a telescopic position adjusting range of the outer column 1 similarly to the third embodiment.

Further, in right and left side surfaces of the clamp part 19 respectively, abutting surfaces 17A and 17B are formed in the vicinity of the axis of the fastening rod 34. The abutting surfaces 17A and 17B are formed to have a little space (0.1 mm to 0.2 mm) between the abutting surfaces 17A and 17B and the inner surfaces 321A and 321B of the side plates 32A and 32B when the fastening rod 34 is unfastened.

The abutting surfaces 17A and 17B can abut on the inner surfaces 321A and 321B of the side plates 32A and 32B throughout the entire length of the telescopic position adjusting range of the outer column 1 like the third embodiment.

Further, recessed parts 11A and 18B are formed between the abutting surfaces 17A and 17B in the vicinity of the axis of the fastening rod 34 and the abutting surfaces 16A and 16B of the outer column 1. The recessed parts 18A and 18B are formed to be recessed more than the abutting surfaces 17A, 17B, 16A and 16B.

The recessed parts 18A and 18B are formed by spaces surrounded by the outer peripheral surface 15A formed below the abutting surfaces 16A and 16B of the outer column 1, inclined parts 19A and 19B at the upper ends of the clamp part 19 and the inner surfaces 321A and 321B of the side plates 32A and 32B. The recessed parts 18A and 18B are formed over the entire length of the telescopic position adjusting range of the outer column 1 like the third embodiment.

When an operating lever 36 is swung in a fastening direction, the inner surfaces 321A and 321B of the side plates 32A and 32B strongly press the abutting surfaces 16A and 16B of the side surfaces of the outer column 1 to deform the outer column 1 toward the axis of the outer column 1.

Further, when the operating lever 36 is swung in the fastening direction, the side plates 32A and 32B are more deformed toward the axis of the outer column 1. As described above, the recessed parts 18A and 16B are formed from the outer peripheral surface 15A below the abutting surfaces 16A and 16B of the outer column 1 to the inclined parts 19A and 19B at the upper ends of the clamp part 19. Accordingly, the inner surfaces 321A and 321B of the side plates 32A and 32B abut on the abutting surfaces 17A and 17B in the vicinity of the axis of the fastening rod 34 to deform the clamp part 19 toward the axis of the outer column 1, narrow the width of a slit 13 and more deform the outer column 1 toward the axis of the outer column 1.

As a result, the diameter of the inner peripheral surface 15B of the outer column 1 is reduced to strongly fasten the outer column 1 to an inner column 2. At the same time, both the abutting surfaces 16A and 16B in the side surfaces of the outer column 1 and the abutting surfaces 17A and 17B in the vicinity of the axis of the fastening rod 34 are strongly fastened by the inner surfaces 321A and 321B of the side plates 32A and 32B.

Accordingly, the abutting surfaces 16A and 16B passing the axis of the outer column 1 are considered to be a fulcrum point, a center of the abutting parts of the abutting surfaces 17A and 17B in the vicinity of the axis of the fastening rod 34 and the inner surfaces 321A and 321B is considered to be a power point, and the clamp part 19 is fastened by a moment proportional to a distance L2 between the fulcrum point and the power point. Therefore, the outer column 1 can be strongly fastened to the inner column 2.

Further, the abutting surfaces 16A and 16B passing the axis of the outer column 1 are also strongly fastened by the inner surfaces 321A and 321B of the side plates 32A and 32B. Accordingly, a distance L1 between the center of the abutting parts of the abutting surfaces 16A and 16B of the outer column 1 and the inner surfaces 321A and 321B and the abutting surfaces 311A and 311B of the flange parts 31A and 31B of a vehicle body attaching bracket 3 and a vehicle body 6 is shorter than that of a conventional steering device.

Accordingly, when a steering force is applied to the outer column 1 from a steering wheel 41, in a moment applied to the vehicle body attaching bracket 3 by this steering force, the abutting surfaces 321A and 311B of the flange parts 31A and 31B and the vehicle body 6 are considered to be a fulcrum point. Further, the center of the abutting parts of the abutting surfaces 16A and 16B in the vicinity of the axis of the outer column 1 and the inner surfaces 321A and 321B is considered to be a power point. A moment proportional to the distance L1 between the fulcrum point and the power point acts on the vehicle body attaching bracket 3. Accordingly, a rightward and leftward supporting rigidity in FIG. 6 is especially improved relative to the steering force applied to the outer column 1.

FIFTH EMBODIMENT

Figure 8:
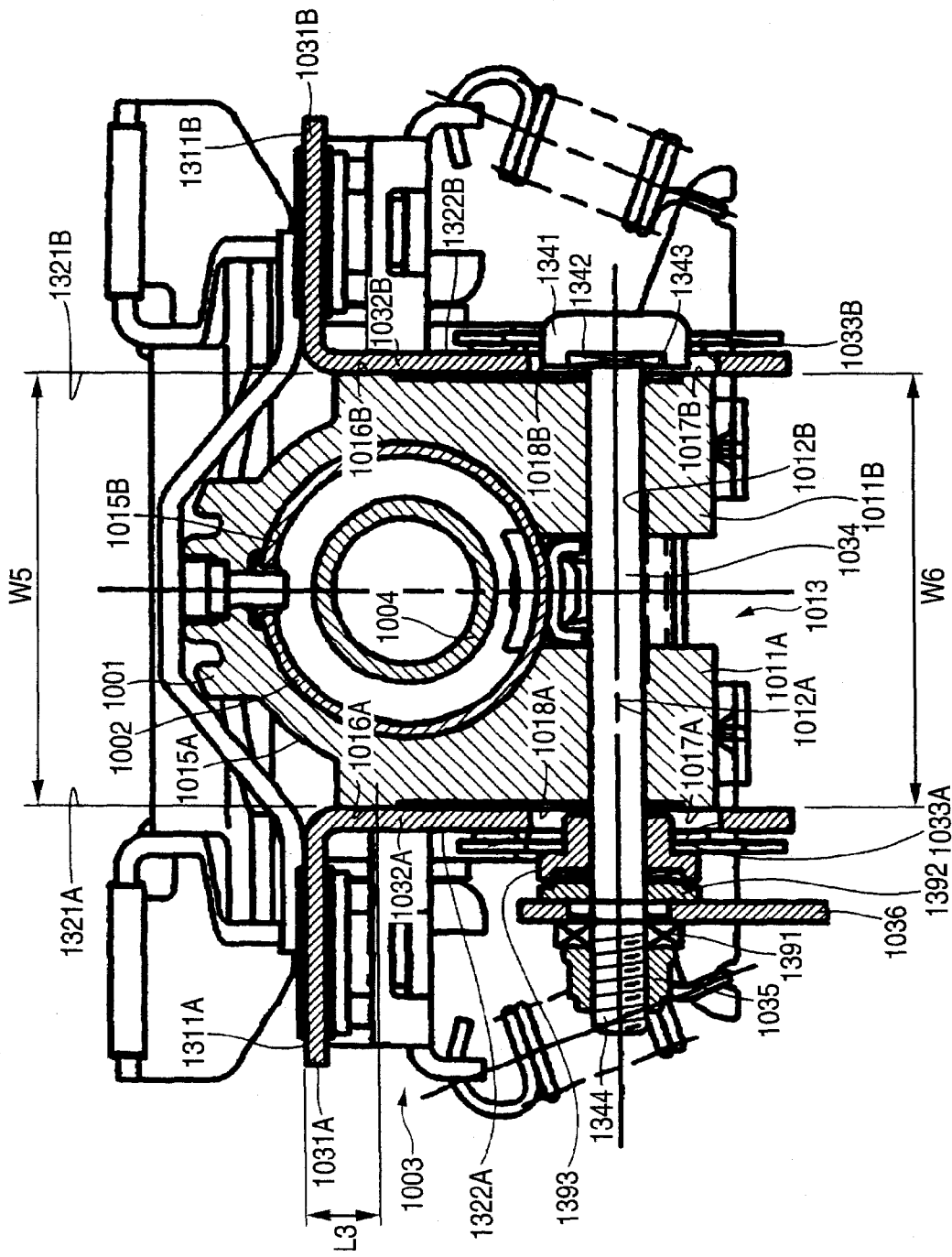
FIG. 8 is an enlarged sectional view taken along a line A-A of FIG. 1.

Now, a fifth embodiment of the present invention will be described below. FIG. 8 is a view corresponding to the enlarged sectional view taken along a line A-A of FIG. 1. In a below-described explanation, only structural parts different from those of the above-described embodiments will be described and a duplicated explanation will be omitted.

As shown in FIG. 8, on the upper part of a vehicle body attaching bracket 1003, a pair of right and left flange parts 1031A and 1031B for attaching the vehicle body attaching bracket 1003 to a vehicle body 1006 are formed. The flange parts 1031A and 1031B are fastened to the vehicle body 1006 by bolts not shown in the drawing and abutting surfaces 1311A and 1311B on the upper surfaces of the flange parts 1031A and 1031B abut on the vehicle body 1006 and are fixed thereto. In the flange parts 1031A and 1031B, a pair of right and left side plates 1032A and 1032B are bent in L shapes and extending downwardly from the flange parts 1001A and 1031B.

An end face 1343 of a head part 1341 abuts on an outer surface 1322B of the side plate 1032B. In a left side of a fastening rod 1034, a male screw 1344 is formed. To the male screw 1344, a cylindrical nut 1035 is screwed. Between a right end face of the nut 1035 and an outer surface 1322A of the left side plate 1032A of the vehicle body attaching bracket 1003, a thrust bearing 1391, an operating lever 1036, a movable cam 1392 and a fixed 1393 are held in order from the left side.

The movable cam 1392 is fixed to the operating lever 1036 and rotates together with the operating lever 1036 by swinging the operating lever 1036. The fixed can 1393 is internally fitted to a tilting long groove 1033A formed in the side plate 1032A to prevent from rotating relative to the vehicle body attaching bracket 1003.

In right and left side surfaces of an outer column 1001, abutting surfaces 1016A and 1016B are formed at positions spaced upward (in an upper side in FIG. 8) from the axis of the fastening rod 1034 in a vehicle body. Further, in side surfaces of clamp parts 1011A and 1011B respectively, abutting surfaces 1017A and 1017B are formed in the vicinity of the axis of the fastening rod 1034.

A horizontal width W5 between the abutting surfaces 1016A and 1016B at the positions spaced upward from the axis of the fastening rod 1034 in the vehicle body is formed to be equal to or larger than a horizontal width W6 between the abutting surfaces 1017A and 1017B in the vicinity of the axis of the fastening rod 1034.

The abutting surfaces 1016A and 1016B are extended from the end face of the outer column 1001 in the front side of the vehicle body to a part in the rear side of the vehicle body and formed to positions slightly passing the ends of telescopic long grooves 1012A and 1012B in the rear side of the vehicle body. Accordingly, the abutting surfaces 1016A and 1016B can abut on the inner surfaces 1321A and 1321B of the side plates 1032A and 1032B over the entire length of a telescopic position adjusting range of the outer column 1001.

When the operating lever 1036 is swung, the movable cam 1392 rotates so that the fixed cam 1393 moves to a right side of FIG. 8 and the fastening rod 1034 is pressed by the movable cam 1392 to move to a left side of FIG. 8. As a result, the fixed cam 1393 fastens the outer surface 1322A of the side plate 1032A and the end face 1343 of the head part 1341 fastens the outer surface 1322B of the side plate 1032B.

The horizontal width W5 between the abutting surfaces 1016A and 1016B at the positions spaced upward from the axis of the fastening rod 1034 in the vehicle body is formed to be equal to or larger than the horizontal width W6 between the abutting surfaces 1017A and 1017B in the vicinity of the axis of the fastening rod 1034. Accordingly, when the width W5 is formed to be larger than the width W6, the inner surfaces 1321A and 1321B of the side plates 1032A and 1032B initially abut on the abutting surfaces 1016A and 1016B at the positions spaced upward from the axis of the fastening rod 1034 in the vehicle body.

Further, when the operating lever 1036 is swung in a fastening direction, the side plates 1032A and 1032B are more elastically deformed toward the axis of the outer column 1001 by considering abutting parts of the abutting surfaces 1016A and 1016B at the positions spaced upward from the axis of the fastening rod 1034 in the vehicle body and the side plates to be a fulcrum point. Accordingly, the inner surfaces 1321A and 1321B of the side plates 1032A and 1032B abut on the abutting surfaces 1017A and 1017B in the vicinity of the axis of the fastening rod 1034 to strongly press the inner surfaces 1321A and 1321B to the abutting surfaces 1017A and 1017B in the vicinity of the axis of the fastening rod 1034. As a result, the clamp parts 1011A and 1011B are deformed toward the axis of the outer column 1 to narrow the width of a slit 1013.

Consequently, the diameter of the inner peripheral surface 1015B of the outer column 1001 is reduced to strongly fasten the outer column 1001 to an inner column 1002. At the same time, both the abutting surfaces 16A and 16B at the positions spaced upward from the axis of the fastening rod 1034 in the vehicle body and the abutting surfaces 17A and 17B in the vicinity of the axis of the fastening rod 1034 are strongly fastened by the inner surfaces 1321A and 1321B of the side plates 1032A and 1032B.

Further, when the width W5 is equal to the width W6, the inner surfaces 1321A and 1321B of the side plates 1032A and 1032B abut on both the abutting surfaces 1016A and 1016B and the abutting surfaces 1017A and 1017B at the same time. Then, when the operating lever 1036 is swung in the fastening direction, the side plates 1032A and 1032B are elastically deformed toward the axis of the outer column 1001 by considering the abutting parts of the abutting surfaces 1016A and 1016B and the side plates to be the fulcrum point and both the abutting surfaces 1016A and 1016B and the abutting surfaces 1017A and 1017B are strongly fastened by the inner surfaces 1321A and 1321B of the side plates 1032A and 1032B.

Accordingly, the abutting surfaces 16A and 16B at the positions spaced upward from the axis of the fastening rod 1034 in the vehicle body are strongly fastened by the inner surfaces 1321A and 1321B of the side plates 1032A and 1032B. Therefore, a distance L3 between the center of the abutting parts of the abutting surfaces 1016A and 1016B at the positions spaced upward from the axis of the fastening rod 1034 in the vehicle body and the inner surfaces 1321A and 1321B and the abutting surfaces 1311A and 1311B of the flange parts 1031A and 1031B of the vehicle body attaching bracket 1003 and the vehicle body 1006 is shorter than that of a conventional steering device.

Accordingly, when a steering force is applied to the outer column 1001 from a steering wheel 1041, in a moment applied to the vehicle body attaching bracket 1003 by this steering force, the abutting surfaces 1311A and 1311B of the flange parts 1031A and 1031B and the vehicle body 6 are considered to be a fulcrum point. Further, the center of the abutting parts of the abutting surfaces 1016A and 1016B at the positions spaced upward from the axis of the fastening rod 1034 and the inner surfaces 1321A and 1321B is considered to be a power point.

A moment proportional to the distance L3 between the fulcrum point and the power point acts on the vehicle body attaching bracket 1003. Accordingly, the number of parts or the number of assembling processes is not increased, a weight is decreased and a rightward and leftward supporting rigidity in FIG. 8 is improved relative to the steering force applied to the outer column 1001.

SIXTH EMBODIMENT

Figure 9:
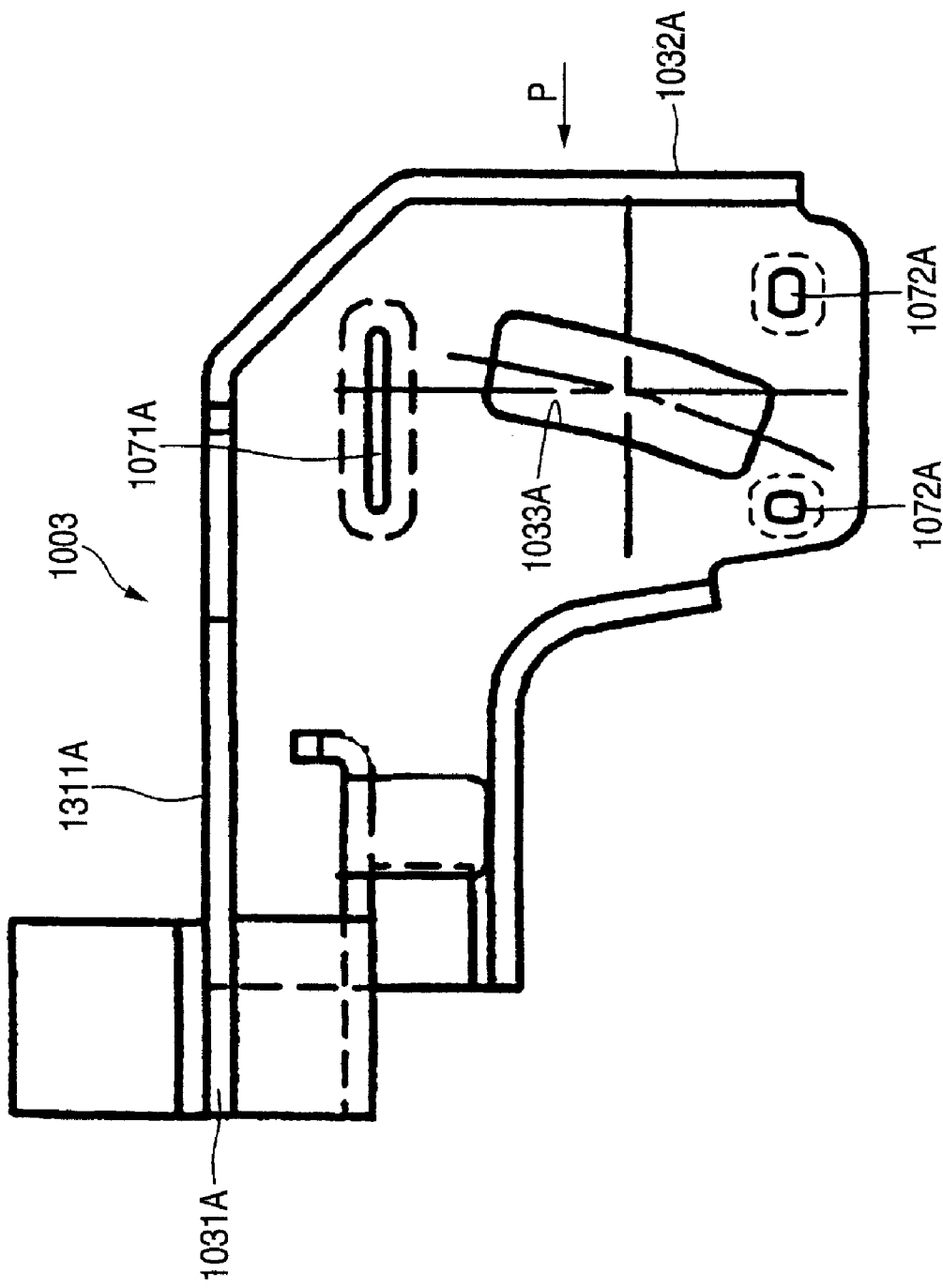
FIG. 9 is a front view showing a simple substance of a vehicle body attaching bracket of a sixth embodiment of the present invention.
Figure 10:
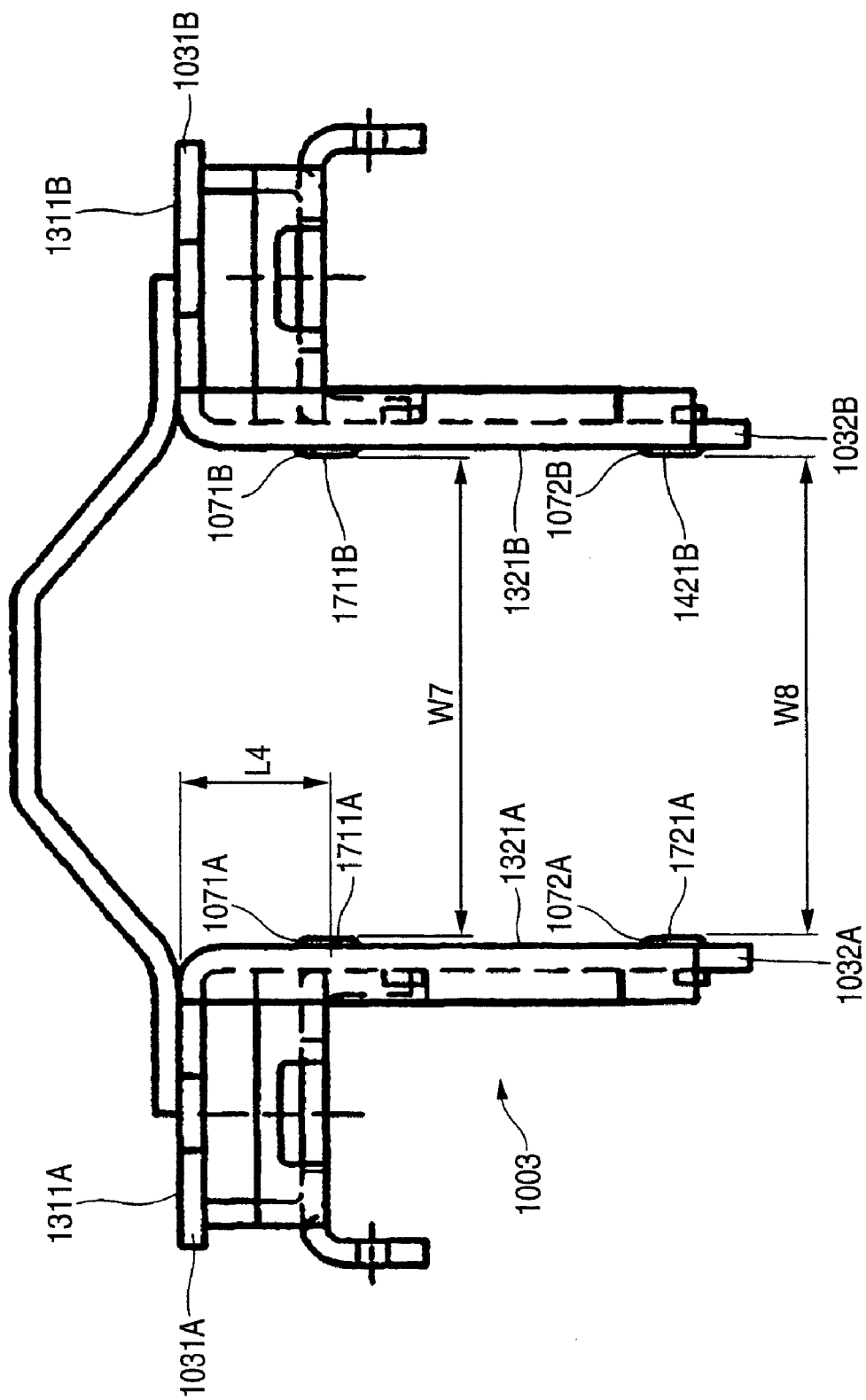
FIG. 10 is a view seen from an arrow P in FIG. 9.

Now, a sixth embodiment of the present invention will be described below. FIG. 9 is a front view showing a simple substance of a vehicle body attaching bracket of a sixth embodiment of the present invention. FIG. 10 is a view seen from an arrow P in FIG. 9. In a below-described explanation, only structural parts different from those of the above-described embodiments will be described and a duplicated explanation will be omitted. Further, the same parts as those of the above-described embodiments are designated by the same reference numerals and described.

The sixth embodiment is a modified embodiment of the fifth embodiment. According to this embodiment, in a horizontal width of the inner surfaces 1321A and 1321B of right and left side plates 1032A and 1032B of a vehicle attaching bracket 1003, a width at a position spaced upward from the axis of a fastening rod 1034 is narrower than a width in the vicinity of the axis of the fastening rod. An outer column 1001 is clamped to the vehicle body attaching bracket 1003, which is not shown in the drawing. The structure of a clamp mechanism such as an operating lever 1036, a fastening rod 1034, a movable can 1392 and a fixed cam 1393 is the same as that of the fifth embodiment.

Namely, as shown in FIGS. 8 to 9, in the right and left side plates 1132A and 1032B of the vehicle body attaching bracket 1003, protruding parts 1071A and 1071B are formed at positions spaced upward from the axis of the fastening rod 1034 in a vehicle body. Further, in the right and left side plates 1032A and 1032B of the vehicle body attaching bracket 1003, protruding parts 1072A and 1072B are formed in the vicinity of the axis of the fastening rod 1034. The protruding parts 1071A and 1071B and 1072A and 1072B respectively protrude toward the right and left side surface sides of the outer column 1001 from the inner surfaces 1321A and 1321B of the right and left side plates 1032A and 1032B.

A horizontal width W7 between abutting surfaces 1711A and 1711B where the protruding parts 1071A and 1071B at the positions spaced upward from the axis of the fastening rod 1034 in the vehicle body abut on the right and left surfaces of the outer column 1001 is formed to be equal or smaller than a horizontal width W8 between abutting surfaces 1721A and 1721B where the protruding parts 1072A and 1072B in the vicinity of the axis of the fastening rod 1034 abut on the right and left side surfaces of the outer column 1001. Though not shown in the drawing, the width of the right and left side surfaces of the outer column 1001 is set to the same dimension in the vicinity of the axis of the outer column 1001 and in the vicinity of the axis of the fastening rod 1034.

The protruding parts 1071A and 1071B are formed in rectangular shapes elongated in a forward and backward direction of the vehicle body in the upper parts of tilting long grooves 1033A and 1033B. Further, two protruding parts 1072A and 1072B are respectively formed in rectangular shapes short in the forward and backward direction of the vehicle body at both sides of the lower parts of the tilting long grooves 1033A and 1033B. The protruding parts 1072A and 1072B may be formed in the rectangular shapes elongated in the forward and backward direction of the vehicle body and one protruding part may be provided or the protruding parts may not be provided.

When the width W7 is formed to be narrower than the width W8 similarly to the fifth embodiment, if the operating lever 1036 is swung to fasten the side plates 1032A and 1032B, the abutting surfaces 1711A and 1711B of the protruding parts 1071A and 1071B at the positions spaced upward from the axis of the fastening rod 1034 in the vehicle body initially abut on the right and left side surfaces in the vicinity of the axis of the outer column 1001.

Further, when the operating lever 1036 is swung in a fastening direction, the side plates 1032A and 1032B are more elastically deformed toward the axis of the outer column 1001 by considering abutting surfaces 1711A and 1711B at the positions spaced upward from the axis of the fastening rod 1034 in the vehicle body to be a fulcrum point. Accordingly, the abutting surfaces 1721A and 1721B of the protruding parts 1072A and 1172B in the vicinity of the axis of the fastening rod 1034 abut on the right and left side surfaces of the outer column 1001 to strongly press the abutting surfaces 1721A and 1721B to the right and left side surface of the outer column 1001. As a result, clamp parts 1011A and 1011B are deformed toward the axis of the outer column 1001 to narrow the width of a slit 1013.

Consequently, the diameter of the inner peripheral surface 1015B of the outer column 1001 is reduced to strongly fasten the outer column 1001 to an inner column 1002. At the same time, both the abutting surfaces 1711A and 1711B of the protruding parts 1071A and 1071B at the positions spaced upward from the axis of the fastening rod 1034 in the vehicle body and the abutting surfaces 1721A and 1721B of the protruding parts 1072A and 1072B in the vicinity of the axis of the fastening rod 1034 are strongly fastened to the right and left side surfaces of the outer column 1001.

Therefore, a distance L4 between the center of the abutting parts of the abutting surfaces 1711A and 1711B of the protruding parts 1071A and 1071B spaced upward from the axis of the fastening rod 1034 in the vehicle body and the right and left side surfaces of the outer column 1001 and abutting surfaces 1311A and 1311B of flange parts 1031A and 1031B of the vehicle body attaching bracket 1003 and a vehicle body 1006 is shorter than that of a conventional steering device. Accordingly, a rightward and leftward supporting rigidity in FIG. 10 is improved relative to a steering force applied to the outer column 1001.

SEVENTH EMBODIMENT

Figure 11:
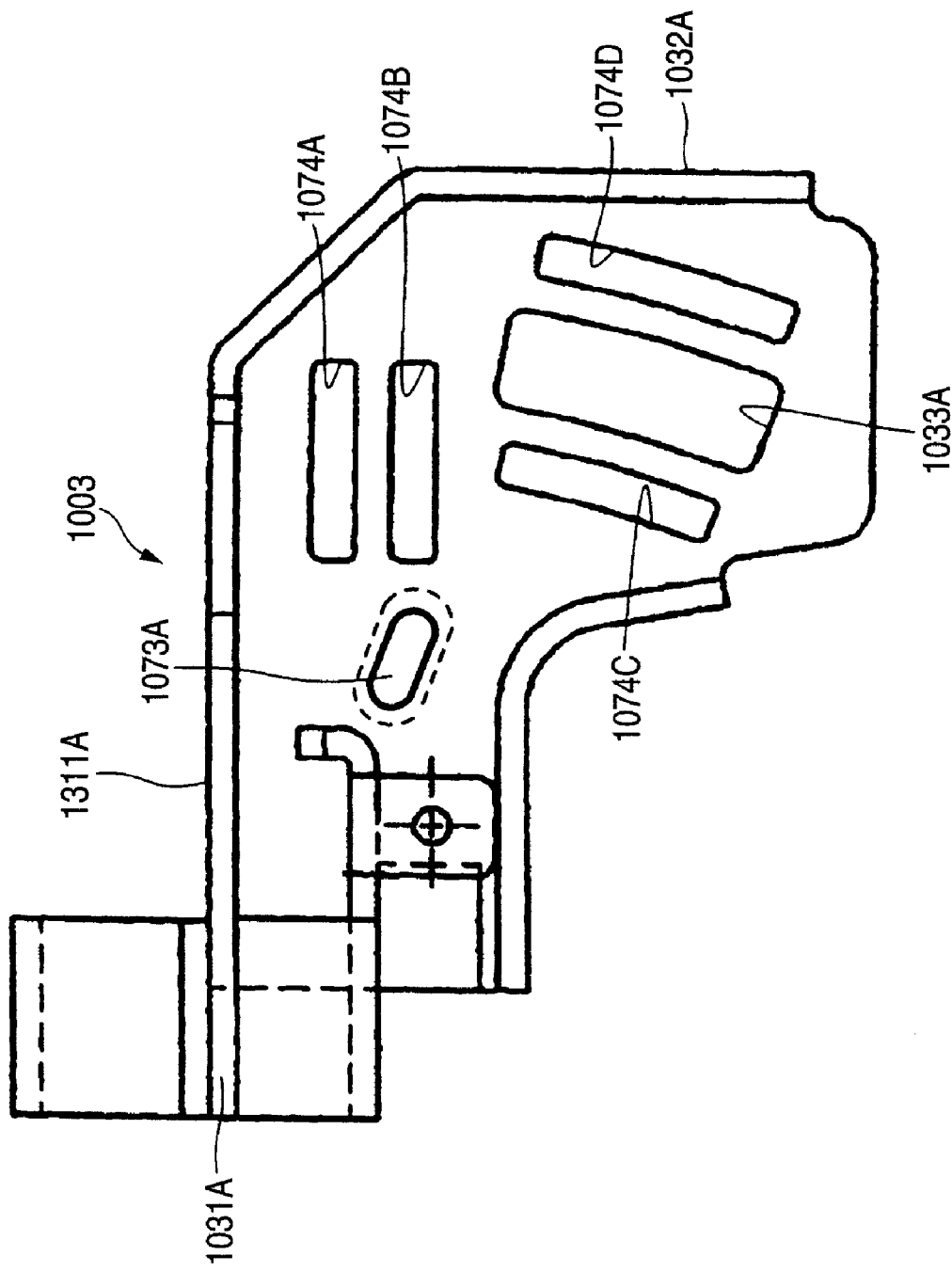
FIG. 11 is a front view showing a simple substance of a vehicle body attaching bracket of a seventh embodiment of the present invention.

Now, a sixth embodiment of the present invention will be described below. FIG. 11 is a front view showing a simple substance of a vehicle body attaching bracket of a seventh embodiment of the present invention. In a below-described explanation, only structural parts different from those of the above-described embodiments will be described and a duplicated explanation will be omitted. Further, the same parts as those of the above-described embodiments are designated by the same reference numerals and described.

The seventh embodiment is a modified embodiment of the sixth embodiment in which when an operating lever 1036 is fastened, side plates 1032A and 1032B of a vehicle body attaching bracket 1003 are easily elastically deformed. In FIG. 11, only a side plate 1032A of a left side is shown. A side plate of a right side has the same form.

Namely, as shown in FIG. 11, in the side plate 1032A of the left side of the vehicle body attaching bracket 1003, a protruding part 1073A is formed at a position spaced upward from the axis of a fastening rod 1034 in a vehicle body. Further, a protruding part is not provided in the vicinity of the axis of the fastening rod 1034 in the side plate 1032A of the left side of the vehicle attaching bracket 1003. An inner surface of the side plate 1032A of the left side directly abuts on the side surface of the left side of an outer column 1001.

Accordingly, a horizontal width between the abutting surfaces where the abutting part 1073A at the position spaced upward from the axis of the fastening rod 1034 in the vehicle body (and a protruding part of the side plate of the right side not shown in the drawing) abut on the right and left side surfaces of the outer column 1001 is formed to be smaller than a horizontal width between the inner surfaces of the side plate 1032A in the vicinity of the axis of the fastening rod 1034

(and an inner surface of the side plate of the right side not shown in the drawing) abut on the right and left side surfaces of the outer column 1001. Though not shown in the drawing, the width of the right and left side surfaces of the outer column 1001 is set to the same dimension at the position spaced upward from the axis of the fastening rod 1034 in the vehicle body and in the vicinity of the axis of the fastening rod 1034.

In the side plate 1032A of the left side of the vehicle body attaching bracket 1003, through holes 1074A, 1074B, 1074C and 1074D passing through the side plate 1032A are formed. The through holes 1074A and 1074B are formed in rectangular shapes elongated in a forward and backward direction of the vehicle body in the upper parts of a tilting long groove 1033A. Further, the through holes 174C and 174D are formed in vertically elongated rectangular shapes at both sides of the tilting long groove 1033A in the forward and backward direction of the vehicle body.

When the operating lever 1036 is swung to fasten the side plate 1032A as in the sixth embodiment, the abutting surface of the protruding part 1073A at the position spaced upward from the axis of the fastening rod 1034 in the vehicle body (and the protruding part of the side plate of the right side not shown in the drawing) initially abuts on the side surface of the left side in the vicinity of the axis of the outer column 1001.

Further, when the operating lever 1036 is swung in a fastening direction, the side plate 1032A (and the side plate of the right side not shown in the drawing) is more elastically deformed toward the axis of the outer column 1001 by considering the abutting surface at the position spaced upward from the axis of the fastening rod 1034 in the vehicle body to be a fulcrum point.

Since the through holes 1074A, 1074B, 1074C and 1074D passing through the side plate 1032A are formed, the side plate 1032A is easily elastically deformed and the inner surfaces of the side plate 1032A in the vicinity of the axis of the fastening rod 1034 (and the side plate of the right side not shown in the drawing) abut on the right and left side surfaces of the outer column 1001 to strongly press the right and left side surfaces of the outer column 1001. As a result, clamp parts 1011A and 1011B are deformed toward the axis of the outer column 1001 to narrow the width of a slit 1013.

Consequently, the diameter of the inner peripheral surface 1013B of the outer column 1001 is reduced to strongly fasten the outer column 1001 to an inner column 1002. At the same time, both the abutting surfaces of the protruding part 1073A at the position spaced upward from the axis of the fastening rod 1034 in the vehicle body (and the protruding part of the side plate of the right side not shown in the drawing) and the inner surfaces of the side plate 1032A in the vicinity of the axis of the fastening rod 1034 (and the side plate of the right side not shown in the drawing) are strongly fastened to the right and left side surfaces of the outer column 1001.

In the seventh embodiment, the through holes 1074A, 1074B, 1074C and 1074D are formed. However, when a long distance can be ensured between the protruding part 1073A and the axis of the fastening rod 1034 and the side plate 1032A is easily elastically deformed, the through holes 1074A, 1074B, 1074C and 1074D are not necessarily required. Further, the protruding part 1073 may not be formed in the side plate 1032A of the vehicle body attaching bracket 1003 and protruding parts may be formed on the right and left surfaces of the outer column 1001 at positions spaced upward from the axis of the fastening rod 1034 in the vehicle body.

EIGHTH EMBODIMENT

Figure 12:
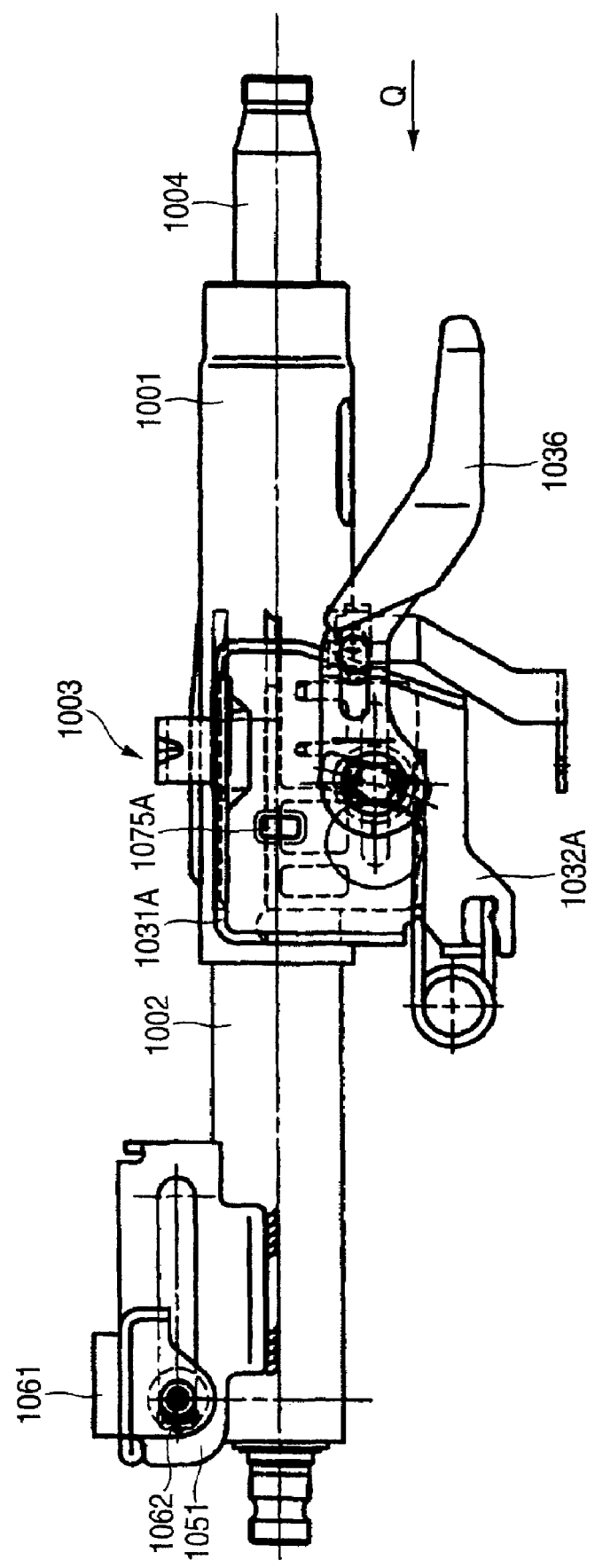
FIG. 12 is an entire front view showing a steering device of an eighth embodiment of the present invention.
Figure 13:
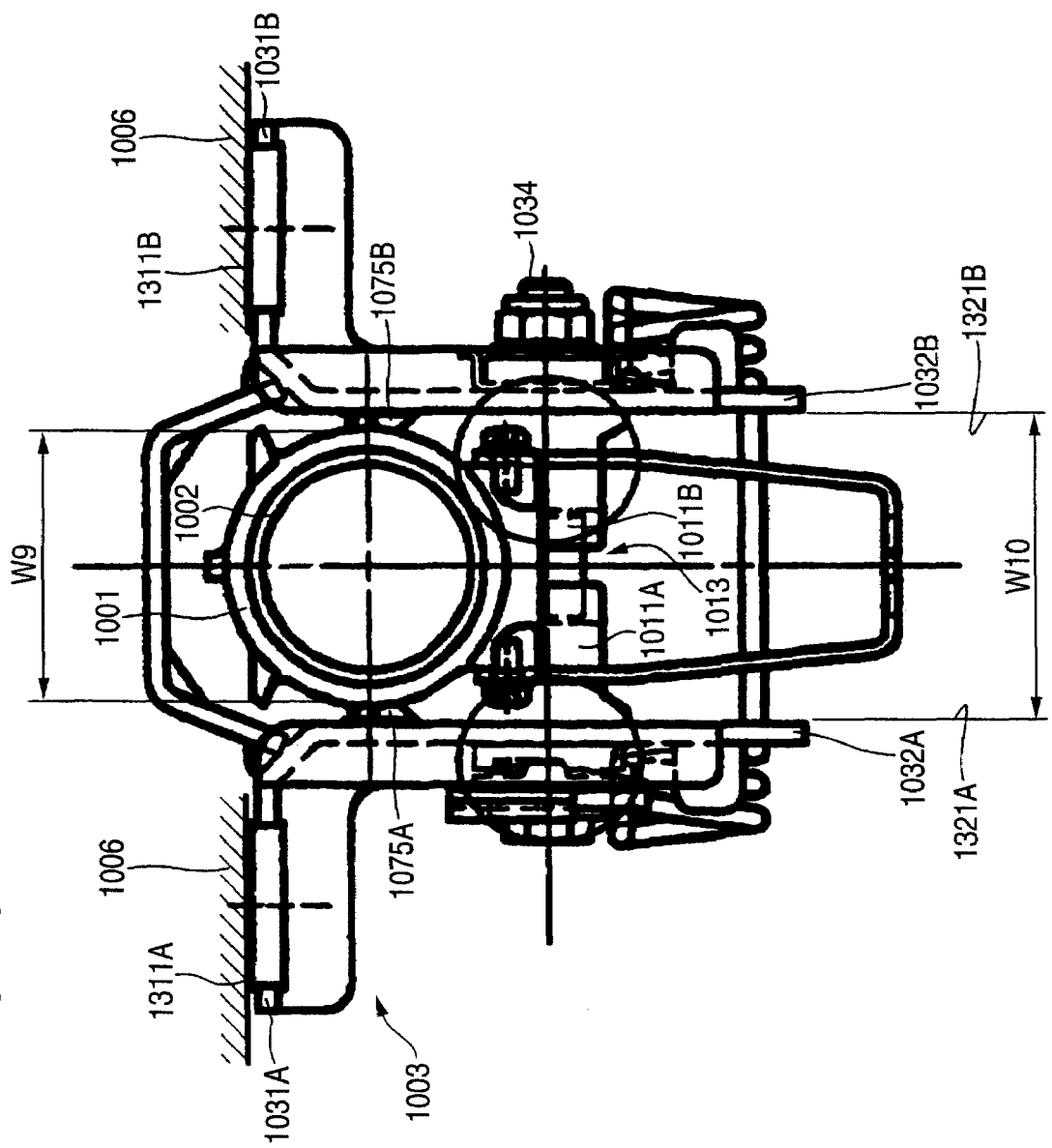
FIG. 13 is a view seen from an arrow Q in FIG. 12.

Now, an eighth embodiment of the present invention will be described below. FIG. 12 is an entire front view of a steering device of the eighth embodiment of the present invention. FIG. 13 is a view seen from an arrow Q in FIG. 12. In a below-described explanation, only structural parts different from those of the above-described embodiments will be described and a duplicated explanation will be omitted. Further, the same parts as those of the above-described embodiments are designated by the same reference numerals and described.

The eighth embodiment is a modified embodiment of the seventh embodiment. As shown in FIGS. 12 and 13, in side plates 1032A and 1032B of a vehicle body attaching bracket 1003, protruding parts 1075A and 1075B are formed at positions spaced upward from the axis of a fastening rod 1034 in a vehicle body. Further, a protruding part is not provided in the vicinity of the axis of the fastening rod 1034 in the side plates 1032A and 1032B of the vehicle body attaching bracket 1003. Inner surfaces 1321A and 1321B of the side plates 1032A and 1032B directly abut on the right and left side surfaces of an outer column 1001.

Accordingly, a horizontal width W9 between abutting surfaces where the protruding parts 1075A and 1075B at the positions spaced upward from the axis of the fastening rod 1034 in the vehicle body abut on the right and left side surfaces of the outer column 1001 is formed to be smaller than a horizontal width W10 between abutting surfaces where the inner surfaces 1321A and 1321B of the side plates 1032A and 1032B in the vicinity of the axis of the fastening rod 1034 abut on the right and left side surfaces of the outer column 1001.

In the side plates 1032A and 1032B of the vehicle body attaching bracket 1003, the through holes as in the seventh embodiment are not formed, however, the thickness of the side plates 1032A and 1032B is reduced so that the side plates 1032A and 1032B are easily elastically deformed.

When an operating lever 1036 is swung to fasten the side plate 1032A and 1032B as in the seventh embodiment, the abutting surfaces of the protruding parts 1075A and 1175B at the positions spaced upward from the axis of the fastening rod 1034 in the vehicle body initially abut on the right and left side surfaces in the vicinity of the axis of the outer column 1001.

Further, when the operating lever 1036 is swung in a fastening direction, the side plates 1032A and 1032B are more elastically deformed toward the axis of the outer column 1001 by considering the abutting surfaces at the positions spaced upward from the axis of the fastening rod 1034 in the vehicle body to be a fulcrum point.

Since the thickness of the side plates 1032A and 1032B is reduced, the side plates 1032A and 1032B are easily elastically deformed and the inner surfaces 1321A and 1321B of the side plates 1032A and 1032B in the vicinity of the axis of the fastening rod 1034 abut on the right and left side surfaces of the outer column 1001 to strongly press the right and left side surfaces of the outer column 1001. As a result, clamp parts 1011A and 1010B are deformed toward the axis of the outer column 1001 to narrow the width of a slit 1013.

Consequently, the diameter of the inner peripheral surface 1015B of the outer column 1001 is reduced to strongly fasten the outer column 1001 to an inner column 1002. At the same time, both the abutting surfaces of the protruding parts 1075A and 1075B at the positions spaced upward from the axis of the fastening rod 1034 in the vehicle body and the inner surfaces 1321A and 1321B of the side plates 1032A and 1032B in the vicinity of the axis of the fastening rod 1034 are strongly fastened to the right and left side surfaces of the outer column 1001.

In the above-described embodiments, the embodiments are shown that are applied to the steering device in which both a telescopic position and a tilting position can be adjusted. However, the present invention may be applied to a steering device in which only the telescopic position can be adjusted. Further, the present invention may be applied to a steering device in which an outer column and an inner column are not expanded or contracted (the telescopic position is not adjusted) and only a tilting position can be adjusted. Further, the present invention may be applied to a steering device having any of adjusting mechanisms. In the above-described embodiments, an explanation is given to the device having the electric power steering device 5, 1005. However, the electric power steering device 5, 1005 may not be provided. Further, in the above description, a fastening mechanism is formed with a cam, however, the fastening mechanism may be formed with a screw.

The present invention is described in detail by referring to the specific embodiments, however, it is to be understood to a person with ordinary skill in the art that various changes or modifications may be made without departing the spirit and the scope of the present invention.

This application is based on Japanese Patent Application (JP application No. 2006-044496) filed on Feb. 21, 2006, and Japanese Patent Application (JP application No. 2006-334129) filed on Dec. 12, 2006 and contents thereof are included herein as a reference.

INDUSTRIAL APPLICABILITY

According to the steering device of the present invention, the number of parts or the number of assembling processes is not increased, a fastening force of an outer column to an inner column can be improved, a weight can be decreased and the supporting rigidity of the outer column to a vehicle body attaching bracket can be improved.

What is claimed is:

1. A steering device comprising:
   a column that supports a steering shaft on which a steering wheel is mounted so as to freely rotate;
   a vehicle body attaching bracket that is attachable to a vehicle body and comprises a pair of right and left side plates for holding right and left side surfaces of the column therebetween;
   a fastening rod spaced from an axis of the column and inserted into the side plates of the vehicle body attaching bracket and the column; and
   fastening members arranged at both ends of the fastening rod to fasten an inner surfaces of the side plates to the side surfaces of the column,
   wherein
   contact surfaces between the right and left side surface of the column and the inner surfaces of the side plates are formed in two parts including a part near the axis of the fastening rod and a part spaced from the axis of the fastening rod, and
   the right and left side surfaces of the column respectively comprises:
      first abutting surfaces that abut on the inner surfaces of the side plates in the vicinity of the axis of the fastening rod;
      second abutting surfaces that abut on the inner surfaces of the side plates in the vicinity of the axis of the column; and
      recessed parts respectively formed between the abutting surfaces and recessed from the abutting surfaces.

2. The steering device according to claim 1, wherein
   the column is an outer column externally fitted to an inner column so as to be telescopically adjustable, and
   the fastening members fasten the outer column to the inner column at a telescopically adjustable position.

3. The steering device according to claim 2, wherein
   the first and second abutting surfaces formed in the right and left side surface of the outer column are provided in the side surfaces of the outer column so as to come into contact with the inner surfaces of the side plates over a telescopic position adjusting range of the outer column.

4. The steering device according to claim 2, wherein
   the outer column is held between the side plates of the vehicle body attaching bracket so that a tilting position is adjustable.

5. The steering device according to claim 2, wherein
   when the fastening members at both the ends of the fastening rod are fastened, the first abutting surfaces abut on the inner surfaces of the side plates.

6. The steering device according to claim 2, wherein
   when the fastening members at both the ends of the fastening rod are fastened, the second abutting surfaces abut on the inner surfaces of the side plates.

7. The steering device according to claim 2, wherein the outer column is integrally formed with aluminum or magnesium.

8. The steering device according to claim 2, wherein
   the first and second abutting surfaces and the recessed parts formed in the right and left side surfaces of the outer column are provided in the side surfaces of the outer column over the entire length of the telescopic position adjusting range of the outer column.

9. The steering device according to claim 1, wherein
   the fastening members fasten the column at a prescribed tilt adjusting position.

* * * * *